United States Patent
Dumon et al.

(10) Patent No.: US 9,412,127 B2
(45) Date of Patent: Aug. 9, 2016

(54) METHODS AND SYSTEMS FOR ASSESSING THE QUALITY OF AN ITEM LISTING

(75) Inventors: Olivier G. Dumon, San Fancisco, CA (US); Ryan McDonald, San Francisco, CA (US); Muhammad Faisal Rehman, San Jose, CA (US); Sanjay Pundlkrao Ghatare, San Jose, CA (US); Ted Tao Yuan, Cupertino, CA (US)

(73) Assignee: eBay Inc., San Jose, CA (US)

( * ) Notice: Subject to any disclaimer, the term of this patent is extended or adjusted under 35 U.S.C. 154(b) by 1010 days.

(21) Appl. No.: 12/476,028

(22) Filed: Jun. 1, 2009

(65) Prior Publication Data
US 2010/0262601 A1   Oct. 14, 2010

Related U.S. Application Data

(60) Provisional application No. 61/167,796, filed on Apr. 8, 2009.

(51) Int. Cl.
G06Q 30/00 (2012.01)
G06F 17/30 (2006.01)
G06Q 30/06 (2012.01)
G06Q 30/02 (2012.01)

(52) U.S. Cl.
CPC ...... *G06Q 30/0629* (2013.01); *G06F 17/30979* (2013.01); *G06Q 30/02* (2013.01); *G06Q 30/0256* (2013.01); *G06Q 30/0603* (2013.01); *G06Q 30/0623* (2013.01); *G06Q 30/0631* (2013.01)

(58) Field of Classification Search
CPC ................................................ G06F 17/30979
USPC ............................... 707/703, 730, 999.007
See application file for complete search history.

(56) References Cited

U.S. PATENT DOCUMENTS

| 5,832,457 A | 11/1998 | O'Brien et al. |
| 6,298,329 B1 | 10/2001 | Walker et al. |
| 6,489,968 B1 | 12/2002 | Ortega et al. |
| 6,766,301 B1 | 7/2004 | Daniel et al. |
| 6,853,982 B2 | 2/2005 | Smith et al. |
| 7,107,226 B1 | 9/2006 | Cassidy et al. |

(Continued)

FOREIGN PATENT DOCUMENTS

WO   WO-2010118167 A1   10/2010

OTHER PUBLICATIONS

"International Application Serial No. PCT/US10/30287, Search Report mailed Jun. 9, 2010", 7.

(Continued)

*Primary Examiner* — Alexey Shmatov
(74) *Attorney, Agent, or Firm* — Schwegman, Lundberg & Woessner, P.A.

(57) ABSTRACT

Methods and systems for assessing the quality of an item listing are described. In an example embodiment, a listing quality score for an item listing is derived as a weighted sum of first and second parts. The first part represents a predicted score based on a comparison of item attributes for the item listing that are known at listing time, with item attributes of similar item listings that have historical data available for assessing their actual performance. The second part is based on one or more observed demand metrics representing actual historical performance of the item listing. The weighting factor is derived, such that over time, the emphasis shifts from the predicted to the observed score.

21 Claims, 13 Drawing Sheets

(56) References Cited

U.S. PATENT DOCUMENTS

| | | | |
|---|---|---|---|
| 7,246,110 | B1 | 7/2007 | Musgrove et al. |
| 7,444,327 | B2* | 10/2008 | Watson et al. ......... 707/999.005 |
| 7,565,367 | B2 | 7/2009 | Barrett et al. |
| 7,603,360 | B2 | 10/2009 | Ramer et al. |
| 7,980,466 | B2 | 7/2011 | Lee et al. |
| 8,290,811 | B1 | 10/2012 | Robinson et al. |
| 8,301,764 | B2 | 10/2012 | Konig et al. |
| 8,306,845 | B2 | 11/2012 | D'imporzano et al. |
| 8,359,301 | B2 | 1/2013 | Aziz et al. |
| 8,364,528 | B2 | 1/2013 | Selinger et al. |
| 8,370,336 | B2 | 2/2013 | Dumon et al. |
| 8,433,297 | B2 | 4/2013 | Ramer et al. |
| 8,459,551 | B2 | 6/2013 | Lee et al. |
| 8,489,515 | B2 | 7/2013 | Mathur |
| 8,566,180 | B2 | 10/2013 | Koski |
| 9,183,280 | B2 | 11/2015 | Achuthan et al. |
| 2001/0037206 | A1 | 11/2001 | Falk et al. |
| 2002/0188503 | A1 | 12/2002 | Banerjee et al. |
| 2003/0069737 | A1 | 4/2003 | Koubenski et al. |
| 2003/0135490 | A1 | 7/2003 | Barrett et al. |
| 2003/0212595 | A1 | 11/2003 | Antonucci |
| 2004/0019494 | A1 | 1/2004 | Ridgeway et al. |
| 2004/0138953 | A1 | 7/2004 | Van Luchene et al. |
| 2004/0177009 | A1 | 9/2004 | Schrenk |
| 2005/0114229 | A1 | 5/2005 | Ackley et al. |
| 2005/0144066 | A1 | 6/2005 | Cope et al. |
| 2005/0144074 | A1 | 6/2005 | Fredregill et al. |
| 2005/0222987 | A1 | 10/2005 | Vadon |
| 2005/0246332 | A1 | 11/2005 | Wang et al. |
| 2006/0149681 | A1 | 7/2006 | Meisner |
| 2006/0178918 | A1 | 8/2006 | Mikurak |
| 2006/0200445 | A1* | 9/2006 | Chen et al. ......... 707/2 |
| 2006/0265281 | A1 | 11/2006 | Sprovieri et al. |
| 2007/0027856 | A1 | 2/2007 | Lee |
| 2007/0033531 | A1 | 2/2007 | Marsh |
| 2007/0150339 | A1 | 6/2007 | Retter et al. |
| 2007/0150470 | A1 | 6/2007 | Brave et al. |
| 2007/0174259 | A1 | 7/2007 | Amjadi |
| 2007/0192314 | A1 | 8/2007 | Heggem |
| 2007/0198355 | A1 | 8/2007 | Samson et al. |
| 2007/0203791 | A1 | 8/2007 | Kohl et al. |
| 2007/0214057 | A1 | 9/2007 | Lee et al. |
| 2007/0266130 | A1 | 11/2007 | Mazur et al. |
| 2007/0276730 | A1 | 11/2007 | Lee |
| 2007/0288433 | A1 | 12/2007 | Gupta et al. |
| 2008/0033939 | A1 | 2/2008 | Khandelwal |
| 2008/0077484 | A1 | 3/2008 | Main et al. |
| 2008/0097975 | A1 | 4/2008 | Guay et al. |
| 2008/0215438 | A1 | 9/2008 | Muthugopalakrishnan et al. |
| 2008/0221997 | A1 | 9/2008 | Wolfe |
| 2008/0250026 | A1 | 10/2008 | Linden et al. |
| 2008/0262928 | A1 | 10/2008 | Michaelis |
| 2008/0270398 | A1 | 10/2008 | Landau et al. |
| 2008/0275864 | A1 | 11/2008 | Kim et al. |
| 2008/0319846 | A1 | 12/2008 | Leming et al. |
| 2009/0061884 | A1 | 3/2009 | Rajan et al. |
| 2009/0119161 | A1 | 5/2009 | Woda et al. |
| 2009/0125511 | A1* | 5/2009 | Kumar ............... 707/5 |
| 2009/0138458 | A1* | 5/2009 | Wanker ............... 707/5 |
| 2009/0144201 | A1 | 6/2009 | Gierkink et al. |
| 2009/0164453 | A1* | 6/2009 | Rothman ............ 707/5 |
| 2009/0254930 | A1 | 10/2009 | Lo et al. |
| 2009/0281923 | A1 | 11/2009 | Selinger et al. |
| 2010/0114654 | A1 | 5/2010 | Lukose et al. |
| 2010/0153205 | A1 | 6/2010 | Retter et al. |
| 2010/0262514 | A1 | 10/2010 | Westphal |
| 2010/0262596 | A1 | 10/2010 | Dumon et al. |
| 2010/0287129 | A1 | 11/2010 | Tsioutsiouliklis et al. |
| 2010/0293494 | A1 | 11/2010 | Schmidt |
| 2010/0325553 | A1 | 12/2010 | Levy |
| 2011/0106600 | A1 | 5/2011 | Malik et al. |
| 2011/0106605 | A1 | 5/2011 | Malik et al. |
| 2011/0106606 | A1 | 5/2011 | Thordsen et al. |
| 2011/0128288 | A1 | 6/2011 | Petrou et al. |
| 2011/0173102 | A1 | 7/2011 | Burns et al. |
| 2011/0258027 | A1 | 10/2011 | Lee et al. |
| 2011/0295895 | A1 | 12/2011 | Musgrove et al. |
| 2012/0066073 | A1 | 3/2012 | Dilip et al. |
| 2012/0078731 | A1 | 3/2012 | Linevsky et al. |
| 2012/0101918 | A1 | 4/2012 | Battle et al. |
| 2012/0259882 | A1 | 10/2012 | Thakur et al. |
| 2013/0035985 | A1 | 2/2013 | Gilbert |
| 2013/0086103 | A1 | 4/2013 | Achuthan et al. |
| 2013/0246196 | A1 | 9/2013 | Lee et al. |
| 2016/0055564 | A1 | 2/2016 | Achuthan et al. |

OTHER PUBLICATIONS

"International Application Serial No. PCT/US10/30287, Written Opinion mailed Jun. 9, 2010", 4.

"International Application Serial No. PCT/US2010/030287, International Preliminary Report on Patentability mailed Oct. 20, 2011", 6 pgs.

"U.S. Appl. No. 11/643,577, Final Office Action mailed Jan. 14, 2011", 16 pgs.

"U.S. Appl. No. 11/643,577, Final Office Action mailed Mar. 3, 2010", 12 pgs.

"U.S. Appl. No. 11/643,577, Non-Final Office Action mailed Jul. 9, 2009", 11 Pgs.

"U.S. Appl. No. 11/643,577, Non-Final Office Action mailed Aug. 4, 2010", 15 pgs.

"U.S. Appl. No. 11/643,577, Non-Final Office Action mailed Dec. 31, 2008", 16 pgs.

"U.S. Appl. No. 11/643,577, Notice of Allowance mailed Jun. 10, 2011", 8 pgs.

"U.S. Appl. No. 11/643,577, Response filed Mar. 31, 2009 to Non Final Office Action mailed Dec. 31, 2008", 13 pgs.

"U.S. Appl. No. 11/643,577, Response filed Apr. 7, 2011 to Final Office Action mailed Jan. 14, 2011", 15 pgs.

"U.S. Appl. No. 11/643,577, Response filed Jun. 3, 2010 to Final Office Action mailed Mar. 3, 2010", 13 pgs.

"U.S. Appl. No. 11/643,577, Response filed Oct. 9, 2009 to Non Final Office Action mailed Jul. 9, 2009", 13 pgs.

"U.S. Appl. No. 11/643,577, Response filed Nov. 4, 2010 to Non Final Office Action mailed Aug. 4, 2010", 13 pgs.

"U.S. Appl. No. 12/476,134, Final Office Action mailed Jan. 24, 2012", 10 pgs.

"U.S. Appl. No. 12/476,134, Non Final Office Action mailed Jul. 18, 2011", 8 pgs.

"U.S. Appl. No. 12/476,134, Notice of Allowance mailed Oct. 5, 2012", 5 pgs.

"U.S. Appl. No. 12/476,134, Response filed Jun. 25, 2012 to Final Office Action mailed Jan. 24, 2012", 10 pgs.

"U.S. Appl. No. 12/476,134, Response filed Nov. 7, 2011 to Non-Final Office Action mailed Jul. 18, 2011", 9 pgs.

"U.S. Appl. No. 12/610,057, Appeal Brief filed Sep. 30, 2013", 19 pgs.

"U.S. Appl. No. 12/610,057, Final Office Action mailed Apr. 29, 2013", 28 pgs.

"U.S. Appl. No. 12/610,057, Non Final Office Action mailed Aug. 2, 2012", 17 pgs.

"U.S. Appl. No. 12/610,057, Response filed Dec. 31, 2012 to Non Final Office Action mailed Aug. 2, 2012", 15 pgs.

"U.S. Appl. No. 12/610,069, Final Office Action mailed Feb. 27, 2013", 26 pgs.

"U.S. Appl. No. 12/610,069, Non Final Office Action mailed Aug. 17, 2012", 15 pgs.

"U.S. Appl. No. 12/610,069, Non Final Office Action mailed Oct. 3, 2013", 43 pgs.

"U.S. Appl. No. 12/610,069, Response filed May 28, 2013 to Final Office Action mailed Feb. 27, 2013", 13 pgs.

"U.S. Appl. No. 12/610,069, Response filed Nov. 19, 2012 to Non Final Office Action mailed Aug. 17, 2012", 13 pgs.

"U.S. Appl. No. 12/610,078, Final Office Action mailed Apr. 5, 2013", 27 pgs.

"U.S. Appl. No. 12/610,078, Non Final Office Action mailed Aug. 17, 2012", 14 pgs.

"U.S. Appl. No. 12/610,078, Non Final Office Action mailed Oct. 30, 2013", 43 pgs.

(56) References Cited

OTHER PUBLICATIONS

"U.S. Appl. No. 12/610,078, Pre-Appeal Brief Request filed Aug. 5, 2013", 5 pgs.

"U.S. Appl. No. 12/610,078, Response filed Dec. 17, 2012 to Non Final Office Action mailed Aug. 17, 2012", 13 pgs.

"U.S. Appl. No. 13/171,057, Non Final Office Action mailed Mar. 7, 2012", 14 pgs.

"U.S. Appl. No. 13/171,057, Notice of Allowance mailed Oct. 11, 2012", 8 pgs.

"U.S. Appl. No. 13/171,057, PTO Response to 312 Amendment mailed May 17, 2013", 2 pgs.

"U.S. Appl. No. 13/171,057, Response filed Jun. 7, 2012 to Non Final Office Action mailed Mar. 7, 2012", 10 pgs.

"U.S. Appl. No. 13/250,936, Advisory Action mailed Jan. 7, 2015", 3 pgs.

"U.S. Appl. No. 13/250,936, Advisory Action mailed May 17, 2013", 3 pgs.

"U.S. Appl. No. 13/250,936, Examiner Interview Summary mailed Dec. 23, 2014", 3 pgs.

"U.S. Appl. No. 13/250,936, Final Office Action mailed Mar. 7, 2013", 8 pgs.

"U.S. Appl. No. 13/250,936, Final Office Action mailed Oct. 24, 2014", 11 pgs.

"U.S. Appl. No. 13/250,936, Non Final Office Action mailed Apr. 2, 2014", 10 pgs.

"U.S. Appl. No. 13/250,936, Non Final Office Action mailed Oct. 26, 2012", 7 pgs.

"U.S. Appl. No. 13/250,936, Notice of Allowance mailed Jun. 26, 2015", 15 pgs.

"U.S. Appl. No. 13/250,936, PTO Response to Rule 312 Communication mailed Oct. 8, 2015", 3 pgs.

"U.S. Appl. No. 13/250,936, Response filed Jan. 28, 2013 to Non Final Office Action mailed Oct. 26, 2012", 12 pgs.

"U.S. Appl. No. 13/250,936, Response filed May 7, 2013 to Final Office Action mailed Mar. 7, 2013", 13 pgs.

"U.S. Appl. No. 13/250,936, Response filed Jul. 8, 2013 to Final Office Action mailed Mar. 7, 2013", 14 pgs.

"U.S. Appl. No. 13/250,936, Response filed Aug. 4, 2014 to Non Final Office Action mailed Apr. 2, 2014", 16 pgs.

"U.S. Appl. No. 13/250,936, Response filed Sep. 20, 2012 to Restriction Requirement mailed Aug. 29, 2012", 10 pgs.

"U.S. Appl. No. 13/250,936, Response filed Dec. 23, 2014 to Final Office Action mailed Oct. 24, 2014", 17 pgs.

"U.S. Appl. No. 13/250,936, Restriction Requirement mailed Aug. 29, 2012", 5 pgs.

"U.S. Appl. No. 13/250,936, Supplemental Notice of Allowability mailed Jul. 13, 2015", 12 pgs.

"U.S. Appl. No. 13/250,936, Supplemental Amendment filed Sep. 3, 2014", 15 pgs.

"U.S. Appl. No. 13/871,408, Non Final Office Action mailed Sep. 26, 2013", 7 pgs.

* cited by examiner

METHODS AND SYSTEMS FOR ASSESSING THE QUALITY OF AN ITEM LISTING

RELATED APPLICATIONS

This patent application claims the benefit of the filing date of the provisional patent application with Application Ser. No. 61/167,796, filed on Apr. 8, 2009, entitled, "METHODS AND SYSTEMS FOR PRESENTING ITEM LISTINGS IN A SEARCH RESULTS PAGE", which is hereby incorporated herein by reference.

TECHNICAL FIELD

The present disclosure generally relates to data processing techniques. More specifically, the present disclosure relates to methods and systems for managing how search results are processed and presented to a user of a computer-based trading or e-commerce application.

BACKGROUND

Advancements in computer and networking technologies have enabled persons to conduct commercial and financial transactions "on-line" via computer-based applications. This has given rise to a new era of electronic commerce (often referred to as e-commerce.) A number of well-known retailers have expanded their presence and reach by operating websites that facilitate e-commerce. In addition, many new retailers, which operate exclusively online, have come into existence. The business models utilized by enterprises operating online are almost as varied as the products and services offered. For instance, some products and services are offered at fixed prices, while others are offered via various auction methods, and still others are offered via a system of classified ad listings. Some enterprises specialize in the selling of a specific type of product (e.g., books) or a specific service (e.g., tax preparation), while others provide a myriad of categories of items and services from which to choose. Some enterprises serve only as an intermediary, connecting sellers and buyers, while others sell directly to consumers.

Despite the many technical advances that have improved the state of e-commerce, a great number of technical challenges and problems remain. One such problem involves determining how to best present products and services (e.g., items) that are being offered for sale, so as to maximize the likelihood that a transaction (e.g., the sale of a product or service) will occur. For instance, when a potential buyer performs a search for a product or service, it may often be the case that the number of item listings that satisfy the potential buyer's query far exceeds the number of item listings that can practically be presented on a search results page. Furthermore, it is well established that the presentation of an item listing in a search results page—for example, the order or placement of the item listing in a list of listings, the font, font size, or color of the listing, and so on—can affect whether potential buyers select the listing, and ultimately purchase the listed product or service.

For enterprises that serve as an intermediary—for example, by connecting buyers with sellers—it is generally desirable that the presentation of item listings occur in a fair manner that strikes a balance between the needs and desires of the various sellers, the buyers or potential buyers, and the enterprise itself. If a preference is given to one seller, such that the one seller's item listings are consistently being presented in the most prominent position(s) on a search results page, other sellers may not participate, which will ultimately have a negative impact on the enterprise. Similarly, if item listings are presented in accordance with an algorithm that is too rigid and that cannot easily be altered or tweaked, such as a first-listed first-presented algorithm, some sellers may attempt to game the system, again negatively impacting other sellers, the potential buyers' experience, and ultimately the enterprise itself. Furthermore, using a simple and rigid algorithm for presenting item listings prevents the enterprise from optimizing the presentation of item listings to improve the overall conversion rate for item listings. This may lead potential buyers to shop elsewhere, which ultimately will negatively affect the e-commerce enterprise.

DESCRIPTION OF THE DRAWINGS

Some embodiments are illustrated by way of example and not limitation in the figures of the accompanying drawings, in which.

DETAILED DESCRIPTION

Methods and systems for processing a search, and presenting search results, are described. In the following description, for purposes of explanation, numerous specific details are set forth in order to provide a thorough understanding of the various aspects of different embodiments of the present invention. It will be evident, however, to one skilled in the art, that the present invention may be practiced without these specific details.

System Architecture

Figure 1:
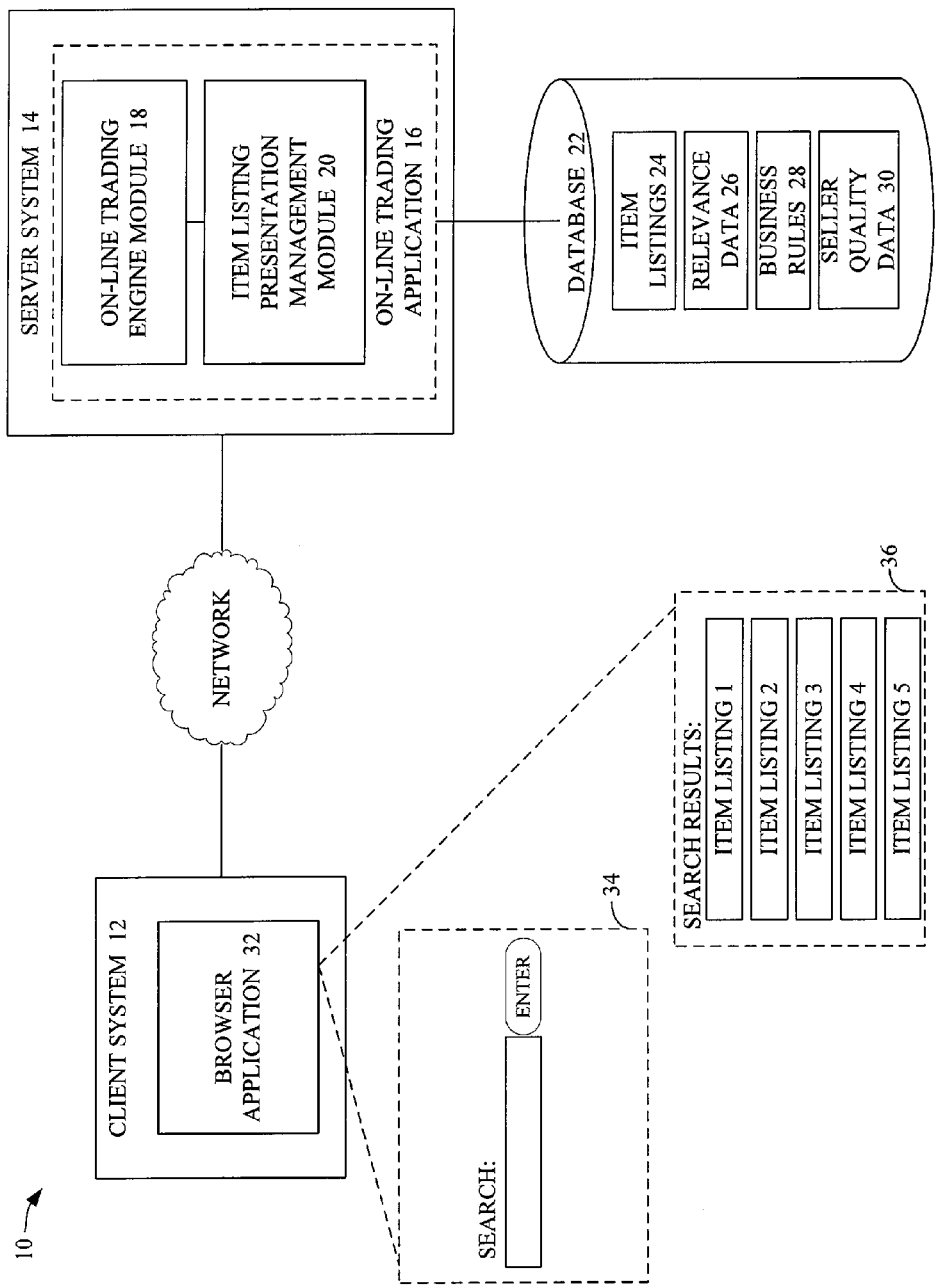
FIG. 1 is a block diagram of a network environment including a network-connected client system and server system, with which an embodiment of the invention might be implemented.

FIG. 1 is a block diagram of a network environment 10 including a network-connected client system 12 and server system 14, with which an embodiment of the invention might be implemented. As illustrated in FIG. 1, the server system 14 is shown to include an on-line trading application 16. In this example, the online trading application 16 is comprised of two primary modules—an on-line trading engine module 18, and an item listing presentation management module 20.

In some embodiments, the on-line trading engine module 18 may consist of a variety of sub-components or modules, which provide some of the functions of an on-line trading application 16. As described more completely below, each module may be comprised of software instructions, computer hardware components, or a combination of both. To avoid obscuring the invention in unnecessary detail, only a few of the on-line trading engine functions (germane to the invention) are described herein. For example, the on-line trading engine module 18 may include an item listing management module (not shown) that facilitates the receiving and storing of data representing item attributes, which collectively form an item listing. When a user desires to list a single item, or multiple items, for sale, the user will provide information about the item(s) (e.g., item attributes). Such information may be submitted via one or more forms of one or more web pages, or via drop down lists, or similar user interface elements. The item listing management module receives the item attributes and stores the item attributes together within a database 22 as an item listing 24. In some instances, the item listings may be stored in an item listing database table. As described in greater detail below, the item attributes of each item listing are analyzed to determine a ranking score assigned to item listings and used in determining the position of item listings when the item listings are being presented in a search results page.

The on-line trading engine module 18 may also include one or more modules for receiving and storing historical data that is used to measure the likelihood that an item listing will, if presented in a search results page, result in a transaction being concluded. For instance, in some embodiments, data associated with user-initiated activities are analyzed and captured for the purpose of predicting future user activities. If a user submits a search request including certain search terms, and then proceeds to conclude a transaction for a particular item (e.g., purchase the item), information from the user's interaction with the online trading application will be captured and stored for the purpose of predicting future actions by other users. Some of the data used in this capacity is generally referred to as relevance data 26 because it is used to determine a measure of relevance between search terms used in a search query, and individual item listings. For instance, if a potential buyer submits a search request with the search terms, "mobile phone", item listings that have certain item attributes are more likely to result in the conclusion of a transaction if presented in a search results page in response to the search request. For instance, continuing with the example search terms, "mobile phone", given the specific search terms used in the search query, item listings that have been designated as being in a certain category of items, such as "Electronics", or even more specifically, "Mobile Phones", are more likely to result in a transaction if presented in a search results page than item listings in other categories, for example, such as "Automobiles" or "Jewelry". Similarly, given the search terms, "mobile phone", item listings with titles that include the search terms may prove more likely to result in a transaction than item listings without the search terms in the title. Accordingly, in some embodiments, the on-line trading engine 18 includes one or more modules for receiving and analyzing historical data to generate what is referred to herein as relevance data. The relevance data is used to derive a measure of the likelihood that item listings with certain item attributes will result in a transaction if displayed in response to certain search terms being submitted in a search request. The relevance data may be derived and used as described in related patent applications, U.S. application Ser. No. 11/679,973, entitled, "DETERMINING RELEVANCY AND DESIRABILITY OF TERMS", filed on Feb. 28, 2007, and U.S. application Ser. No. 11/821,928, entitled, "ECONOMIC OPTIMIZATION FOR PRODUCT SEARCH RELEVANCY", filed on Jun. 26, 2007, both of which are incorporated herein by reference.

The on-line trading engine module 18 may also include one or more modules for receiving and storing data representing, among other things, a measure of a seller's performance of obligations associated with transactions in which the seller has participated. For instance, in some embodiments, when a transaction is concluded, a buyer may be prompted to provide feedback information concerning the performance of a seller. The buyer may, for example, rate the accuracy of the seller's description of an item provided in the item listing. For instance, if the item received by the buyer is in poor condition, but was described in the item listing as being in good condition, the buyer may provide feedback information to reflect that the seller's description of the item in the item listing was inaccurate. As described more fully below, this information may be used in a variety of ways to derive a ranking score for an item listing. For instance, in some cases, the seller feedback information may be used to determine a ranking score for another item listing of the same seller. Such information may be stored in a database 22, as indicated in FIG. 1 by the seller quality data with reference number 30.

As illustrated in FIG. 1, the database is also shown to include business rules data 28. As described in greater detail below, the business rules data 28 is managed and used by a business rules management module for the purpose of promoting and/or demoting item listings that satisfy a search query. For instance, when determining the order or arrangement of item listings for presentation on a search results page, an item listing may be promoted—presented in a more prominent position—or, demoted—presented in a less prominent position—based on the evaluation of a business rule that is dependent upon certain business rule data 28. In some embodiments, item attributes and seller attributes may be used in conjunction with business rule data, for the purpose of evaluating business rules. In some embodiments, the promotion or demotion may be effected by multiplying a business rules score and the ranking score. Business rules may be used to promote certain business policies and to impact user's behavior. For instance, a business rule that provides a promotion to item listings that are offering free shipping will likely have the effect of persuading sellers to offer free shipping to have their item listings appear in the most prominent positions of the search results page. Similarly, demoting item listings based on negative seller feedback information will typically motivate sellers to perform their obligations as agreed upon.

Figure 2:
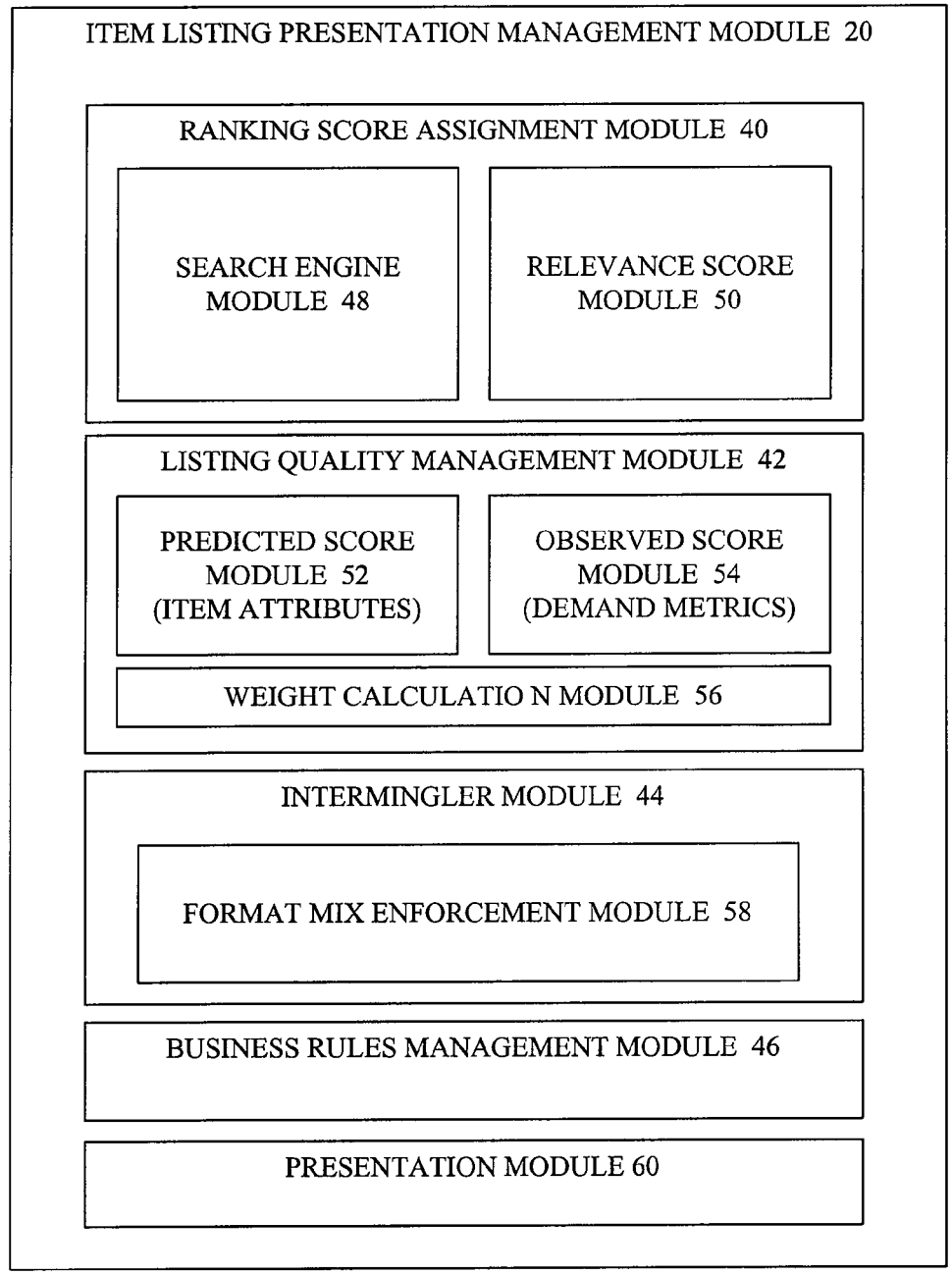
FIG. 2 illustrates an example of the various functional components or modules comprising the item listing presentation management module, according to an embodiment of the invention.

Referring again to FIG. 1, the second primary module of the on-line trading application 16 is an item listing presentation management module 20. The item listing presentation management module 20, which is described more completely in connection with the description of FIG. 2, provides the logic used to assign a ranking score (sometimes referred to as a Best Match Score) to item listings that satisfy a search query, and to use the ranking score to determine the order of item listings when the item listings are presented in a search results page.

For instance, in some embodiments, a user operates a web browser application 32 on a client system 12 to interact with the on-line trading application residing and executing on the server system 14. As illustrated by the example user interface with reference number 34, a user may be presented with a search interface 34, with which the user can specify one or more search terms to be used in a search request submitted to the on-line trading application 16. In some embodiments, in addition to specifying search terms, users may be able to select certain item attributes, such as the desired color of an item, the item categories that are to be searched, and so on. After receiving and processing the search request, the on-line trading application 16 communicates a response to the web browser application 32 on the client system 12. For instance, the response is an Internet document or web page that, when rendered by the browser application 32, displays a search results page 36 showing several item listings that satisfy the user's search request. As illustrated in the example search results page 36 of FIG. 1, the item listings are arranged or positioned on the search results page in an order determined by the item listing presentation management module 20. The item listings are, in some embodiments, presented by a presentation module, which may be a web server or an application server.

In general, the item listings are presented in the search results page in an order based on a ranking score that is assigned to each item listing that satisfies the query. In some embodiments, the item listings will be arranged in a simple list, with the item listing having the highest ranking score appearing at the top of the list, followed by the item listing with the next highest ranking score, and so on. In some embodiments, several search results pages may be required to present all item listings that satisfy the query. Accordingly, only a subset of the set of item listings that satisfy the query may be presented in the first page of the search results pages. In some embodiments, the item listings may be ordered or arranged in some other manner, based on their ranking scores. For instance, instead of using a simple list, in some embodiments the item listings may be presented one item listing per page, or, arranged in some manner other than a top-down list.

As described in greater detail below, the ranking score may be based on several component scores including, but by no means limited to: a relevance score, representing a measure of the relevance of an item listing with respect to search terms provided in the search request; a listing quality score, representing a measure of the likelihood that an item listing will result in a transaction based at least in part on historical data associated with similar item listings; and, a business rules score, representing a promotion or demotion factor determined based on the evaluation of one or more business rules. As used herein, a component score is a score that is used in deriving the overall ranking score for an item listing. However, a component score in one embodiment may be a ranking score in another embodiment. For instance, in some embodiments, the ranking score may be equivalent to a single component score, such as the listing quality score. Similarly, in some embodiments, the ranking score may be equivalent to the business rules score.

FIG. 2 illustrates an example of the various functional components or modules comprising the item listing presentation management module 20, according to an embodiment of the invention. As illustrated in FIG. 2, the item listing presentation management module 20 is comprised of four primary modules, including a ranking score assignment module 40, a listing quality management module 42, an intermingler module 44 and a business rules management module 46. In some embodiments, each of the four primary modules receives some input data and derives a component score, or otherwise effects the outcome of the overall ranking score (e.g., the Best Match Score) that is assigned to an individual item listing. In addition, the ranking score assignment module 40 facilitates the actual assignment of the ranking scores to the individual item listings, and in some embodiments, arranges or orders the item listings based on their assigned ranking scores. In some embodiments, the presentation module 60, which may be a document or page generator, a web server, or application server, facilitates that actual presentation of the search results page containing the search results.

The ranking score assignment module 40 includes a search engine module 48 and a relevance score module 50. The ranking score assignment module 40 assigns a ranking score to each item listing that satisfies a search query, such that the ranking score can be used to order or arrange item listings when the item listings are presented in a search results page. In some embodiments, the ranking score will be determined based on a variety of component scores (e.g., relevance score, listing quality score, business rules score), however, it will be appreciated that the ranking score might be based on a single component score (e.g., the relevance score alone), or various combinations of the component scores. In some embodiments, after assigning a ranking score to each item listing that satisfies a specific user's search query, the ranking score assignment module 40 generates a list, or otherwise orders, the item listings that satisfy the search query. Alternatively, in some embodiments, a separate ordering module (not shown) might be utilized to order the item listings.

In some embodiments, the search engine module 48 provides the actual search function. For instance, the search engine module 48, in some embodiments, receives and processes a search request to identify the item listings that satisfy the search request. It will be appreciated by those skilled in the art that a variety of search techniques might be implemented to identify item listings that satisfy a search request. In general, however, the item attributes of item listings are analyzed for the presence of the user-provided search terms. For instance, in some embodiments, the title and/or user-provided item description are searched for the presence of search terms included in the search query. In some instances, particularly when a user is performing an advanced search, other item attributes such as a user-specified category for the item listing may be used to identify item listings satisfying the search query. The exact methods and algorithms used to execute a search, however, are beyond the scope of the present application.

In an alternative embodiment, the search engine module 48 may represent an interface to a search engine implemented as an external component or module, for example, as part of the on-line trading engine module 18, or as a separate external module. In such a scenario, the search engine module 48 may simply receive the set of item listings that satisfy a search query.

As illustrated in FIG. 2, the ranking score assignment module 40 includes a relevance score module 50, which determines a relevance score for each item listing that satisfies a search query, based at least in part on the search terms used in the search query. In general, the relevance score assigned to an item listing is based on an analysis of historical data and represents a measure of the likelihood (e.g., a probability) that the item listing will result in a transaction being concluded in view of the particular search terms included in the search request. In some embodiments, the search methods and the calculation and/or determination of a relevance score may be achieved with algorithms and methods consistent with those described in related patent applications, U.S. application Ser. No. 11/679,973, entitled, "DETERMINING RELEVANCY AND DESIRABILITY OF TERMS", filed on Feb. 28, 2007, and U.S. application Ser. No. 11/821,928, entitled, "ECONOMIC OPTIMIZATION FOR PRODUCT SEARCH RELEVANCY", filed on Jun. 26, 2007.

The listing quality management module 42 determines a listing quality score, which, in some embodiments, is used as a component score in determining the ranking score for each item listing that satisfies a query. As described in greater detail below, the listing quality score represents a measure of the likelihood that an item listing, if presented in a search results page, will result in a transaction being concluded. The listing quality score, in some embodiments, is derived as a weighted sum of a first part—a predicted score based on item attributes of the item listing, and in some cases seller attributes, that are determinable at the time of listing—and a second part—a score based on demand metrics that are observed over time. As such, the listing quality management module is shown in FIG. 2 to include a predicted score module 52 and an observed score module 54 for deriving the predicted listing quality score, and the observed listing quality score.

In some embodiments, the predicted score module 52 determines the predicted listing quality score (e.g., the first part) by comparing item attributes of the item listing to which the listing quality score is being assigned, with item attributes of item listings that are determined to be similar. For instance, if a particular item listing is offering for sale a television set at a particular price (e.g., $100), the particular price may be compared with the prices of similar television sets that have previously been sold. If, for example, the price of the television set is lower than the mean, mode, or median price (e.g., $200) of similar television sets, which have sold recently, then the listing quality score should reflect the "good" price of the television set offered via the item listing.

In some embodiments, the observed score module 54 determines the observed listing quality score (e.g., the second part) by deriving and analyzing demand metrics representing the actual historical performance of the item listing, or item listings determined to be similar. The actual historical performance may be based on some time-based metric. For instance, in some embodiments, the demand metric may be the number of transactions (e.g., sales) per search impression, which may generally be referred to as a conversion rate. Accordingly, if a particular item listing results in a transaction being concluded (e.g., a sale) every time the item listing is presented in a search results page, then this strong performance of the item listing should be reflected in the listing quality score. Similarly, if an item listing has lots of search impressions—that is, it has been presented in a search results page several times—but has no, or only a few, transactions, then the item listing may not be a strong performing item listing, and this poor performance should be reflected in a lower listing quality score.

Of course, a single quantity item listing—that is, an item listing offering only a single item—will not have the benefit of the demand metric, transactions per search impressions, as the item listing expires upon the first (and only) transaction (e.g., sale of the item). Accordingly, in some embodiments, for some types of item listings, such as auctions and single item fixed price listings, the demand metric for determining the observed listing quality score may be based on the number of views, the number of bids (for an auction), or the number of watch lists associated with the item listing. Alternatively, in some embodiments, the demand metric for singe-item listings (both auctions and fixed price) may be based on the performance of item listings determined to be similar to the single quantity item listing. The demand metric for a multi-quantity item listing, however, may be based on the performance of the actual item listing, item listings determined to be similar, or some combination.

When an item listing is first generated and initially listed, the item listing will not have any historical data available for assessing its actual performance. Therefore, the listing quality score of a new item listing is based primarily on a prediction (e.g., the predicted listing quality score), taking into consideration the historical performance of item listings with similar item attributes. However, over time, as the new item listing is presented in search results pages, historical data for assessing the performance of the item listing will become available. Consequently, in some embodiments, the listing quality score is based on a weighted sum of the predicted score and the observed score, such that, over time, the weight is shifted to move the emphasis from the predicted listing quality score to the observed listing quality score, as historical data becomes available to assess the actual performance of the item listing, and thus the demand for the item offered via the item listing. For instance, the weighting may be adjusted over time, such that, in the beginning, when an item listing is new, the emphasis is on the predicted score component. This is because the observed data for determining the demand metrics may not yet be available. Over time, however, as the item listing is displayed in search results pages, the actual historical data used for deriving the observed demand metric may be collected. As such, over time, the weight applied to the predicted listing quality score may be reduced, and the weight applied to the observed listing quality score (e.g., the demand metric(s)) may be increased. Accordingly, as shown in FIG. 2, in some embodiments, a weight calculation module 56 determines the weighting factor used in deriving the listing quality score for each item listing.

In some embodiments, item listings may be grouped by some item attribute, such that item listings from each group are intermingled with one another, according to some predefined ratio, when presented in a search results page. For example, in some embodiments, item listings may have an item attribute that indicates whether the item(s) offered via the item listing is being offered via an auction process, or via a fixed price. The intermingler module 44 may ensure that the search results page includes item listings from both groups (e.g., auction and fixed price) in quantities established by some predefined ratio. Similarly, item listings may be grouped into "known" item listings and "unknown" item listings, where "known" item listings represent item listings for which historical data is available to derive one or more demand metrics for the purpose of assessing their actual performance, and "unknown" item listings represent newer item listings for which there is insufficient historical data available to confidently derive a demand metric for use in assessing the performance of the item listing. Accordingly, the format mix enforcement module 58 may specify and enforce a certain mix of item listings, based on some item attribute, such as an item attribute indicating the offering is via auction or fixed price, or that an item listing is in the "known" group, or the "unknown" group. Other item attributes may also be used by the format mix enforcement module 58 and intermingler module 44.

Another module may provide for the general administration, evaluation and enforcement of one or more business rules, as indicated in FIG. 2 by the business rules management module 46. In some embodiments, business rules may be used to promote or demote an item listing, such that a promoted or demoted item listing will have its ranking score increased (promotion) or decreased (demotion), effectively repositioning the item listing in the search results page to give the item listing a more prominent position for a promotion, and a less prominent position for a demotion. For example, a business rule may be specified as follows:

IF(CATEGORY=JEWELRY & SELLER QUALITY SCORE<3)=>-20%

In this example, an item listing that has been designated as being in the category, "JEWELRY", is to have its ranking score decreased by twenty percent if the seller quality score is less than three. This business rule reflects the desire to ensure that, when a potential buyer is interested in an item of jewelry, the item listings presented in the most prominent positions of the search results page are from sellers who have good seller quality scores, and thus can generally be trusted. Other business rules may be formulated to promote or demote items based on a variety of seller attributes and item attributes, including an item listing's proposed shipping method and/or cost.

Best Match Scores

In some embodiments, when processing a query resulting from a potential buyer's search request, the item listings that satisfy the search request are ordered or otherwise positioned or arranged in a search results page (e.g., an Internet document or web page) based on a ranking score calculated for, and assigned to, each item listing. For instance, in response to receiving and processing a search request, one or more algorithms are used to assign ranking scores (sometimes referred to as a Best Match Score) to each item listing that satisfies the search request. The ranking scores assigned to the item listings that satisfy the search request are then used to determine where each individual item listing is to appear when presented to a user in a search results page. Accordingly, in some embodiments, the item listings that are assigned the highest ranking scores are placed in the positions deemed to be most prominent, and therefore most likely to be seen and selected by a user. For example, the item listings with the highest ranking scores may be positioned at the top of a first page of several search results pages that together comprise a long list of item listings that satisfy a potential buyer's search request.

Figure 3:
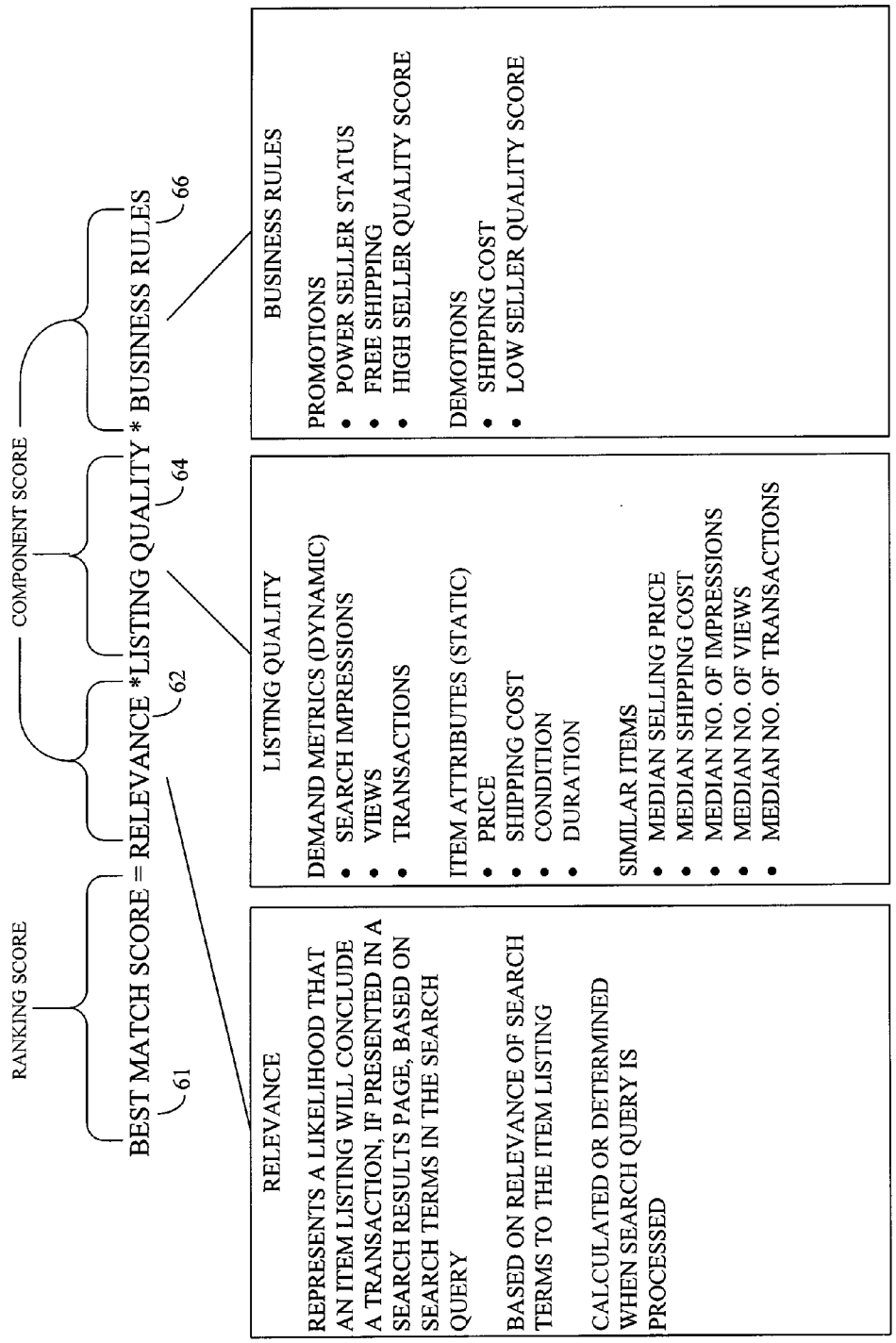
FIG. 3 illustrates an example of a formula or equation, which is used to derive a ranking score, in some embodiments of the invention.

In some embodiments, the ranking score is itself comprised of several sub-scores or component scores. For instance, as illustrated in FIG. 3, a ranking score 61 (e.g., Best Match Score) may be calculated as the product of a relevance score 62, listing quality score 64 and business rules score 66. Because the ranking score is calculated as a product, if any component score is low, or zero, it will have a significant impact on the overall score. This is in contrast to a ranking method that uses simple arithmetic to combine component scores. In such a scenario, an item listing with one low component score may still have a reasonable overall score if the other component scores are high.

As illustrated in FIG. 3, the ranking score is based in part on a relevance score 62. The relevance score 62 is a measure of the relevance of an item listing, in light of the search terms submitted by the user. The relevance score may be based on an analysis of an item listing's title (e.g., title relevance) as well as an item listing's item description, and historical data indicating how users have previously interacted with item listings having similar item attributes when those item listings were previously presented in a search results page. The relevance score 62 is calculated at the time the search query is processed. Thus, in some embodiments, when the set of item listings satisfying the query are returned, the item listings are associated with a corresponding relevance score 62, and may be ordered based on their corresponding relevance scores 62.

As illustrated in FIG. 3, the ranking score is also based in part on a listing quality score 64. The listing quality score 64, which is described in greater detail below in connection with the description of FIGS. 5, 6, 7 and 8, represents a measure of the quality of the item listing. For instance, the listing quality score represents the likelihood (expressed as a probability in some instances) that an item listing will result in conclusion of a transaction, if presented in a search results page. In some embodiments, the listing quality score is computed as a weighted sum of a predicted score—based on item attributes known at listing time—and, an observed score—based on actual performance of the item listing, or item listings determined to be similar.

The part of the listing quality score representing the predicted score is based on an analysis of item attributes of the item listing, in comparison with item attributes of item listings determined to be similar. Although many item attributes may be considered in various embodiments, in some embodiments the price of the item and the shipping cost are the primary predictors of quality. For instance, the price of an item listing relative to the prices of similar item listings that have previously resulted in transactions is used as a metric to indicate the likelihood that an item listing will result in a transaction. If the price for the item listing is below the median price for similar item listings, the likelihood that a transaction will conclude if the item listing is presented increases. Similarly, if the price for the item listing is greater than the median price for similar item listings, the likelihood of a transaction concluding decreases. The same general analysis can be undertaken for shipping cost as well. In some embodiments, the shipping cost is analyzed separately from the price of the item, and in some cases, the shipping cost and price are summed to derive a total price that is used in the analysis.

The listing quality score is also based in part on an observed score representing a demand metric or combination of demand metrics. A demand metric represents a measure of the demand for an item based at least in part on historical data. For instance, in some embodiments, a demand metric used for calculating a listing quality score is calculated as a ratio of the number of transactions concluded per search impressions for an item listing, or for item listings determined to be similar. For example, in the case of a multi-quantity item listing—that is, an item listing offering multiple items (e.g., one-hundred mobile phones)—the observed demand metric may be derived as the ratio of the number of transactions concluded per the number of search impressions for the item listing. Again referring to the example item listing for a mobile phone, if five out of ten times the item listing is presented in a search results page a buyer concludes a transaction by purchasing a mobile phone, then the transactions per search impressions ratio is fifty percent (50%). This demand metric may be normalized, such that the final observed score takes into consideration the performance of the item listing in relation to the performance of other item listings for similar items. For instance, for certain categories of items (e.g., Automobiles, Coins, Stamps, Mobile Phones, and so on), different observed scores may be interpreted differently. For instance, ratio of the transactions per search impressions with value fifty percent (50%) may be viewed as a "good" ratio, indicating a strong item listing performance, for one category (e.g., Automobiles), but a "bad" ratio, indicating a weak item listing performance for another category (e.g., Mobile Phones).

In general, if the ratio of the number of transactions per search impressions for an item listing is high, the likelihood that the item listing will result in a transaction is also high. However, if the total number of search impressions for a given item listing is low, the confidence in the demand metric may be low. For instance, if the item listing has only one search impression, and that search impression ultimately resulted in a transaction, it may be difficult to predict whether the item listing is a "good" item listing. Accordingly, and as described more completely below, the weighting factor for the demand metric may be a function of the number of search impressions for the item listing, or a metric referred to as time on site (TOS), representing the length or duration of time the item listing has been active.

In some embodiments, the weighting factor is a function of a time-based metric, such that, when the item listing is first listed, the emphasis is on the predicted score, but over time, the emphasis is shifted to the observed score. For example, in some embodiments, the weighting factor is a function of the number of search impressions that an item listing has received. For instance, when the search impression count (i.e., the number of times an item listing has been presented in a search results page) reaches some minimum threshold, the weighting factor applied to the predicted score is decreased, resulting in less emphasis on the predicted score, and the weighting factor applied to the observed metric is increased, resulting in greater emphasis on the observed metric component of the listing quality score.

In some embodiments, a single algorithm is used to assign a score to each item listing. For example, after determining which item listings satisfy a search request, a single algorithm is used to assign a score to each item listing determined to satisfy the search request. This score (e.g., the Best Match Score) is then used to determine the position of each item listing when the item listings are presented to a user, for example, in a search results page. Alternatively, in some embodiments, several algorithms are utilized to assign scores to item listings. For instance, in some embodiments, a separate algorithm is used to assign scores to item listings based on a characteristic of the item listings, such that the algorithm used for any particular item listing is selected based on a particular characteristic or attribute value of the item listing. For instance, when the total population of item listings includes both auction listings and fixed-price listings, one algorithm may be used to assign a score to all item listings that include a fixed price, while a separate algorithm may be used for item listings that are offered at auction. Similarly, with multiple-quantity item listings offered at a fixed price—that is, item listings that offer multiple units of the same item at a fixed price—separate algorithms may be used to assign scores to those item listings that are new—and thus do not have available historical data for assessing the quality of the item listing—and those item listings that are older—and thus have available historical data for assessing the quality of the item listing. Similarly, different algorithms may be used to assign listing quality scores to item listings in different categories. For instance, some categories (e.g., Mobile Phones) may use transactions per search impressions as the observed demand metric for the observed listing quality score, whereas item listings in another category (e.g., Automobiles) may use the ratio of views per search impression as the demand metric for the observed listing quality score.

Figure 4:
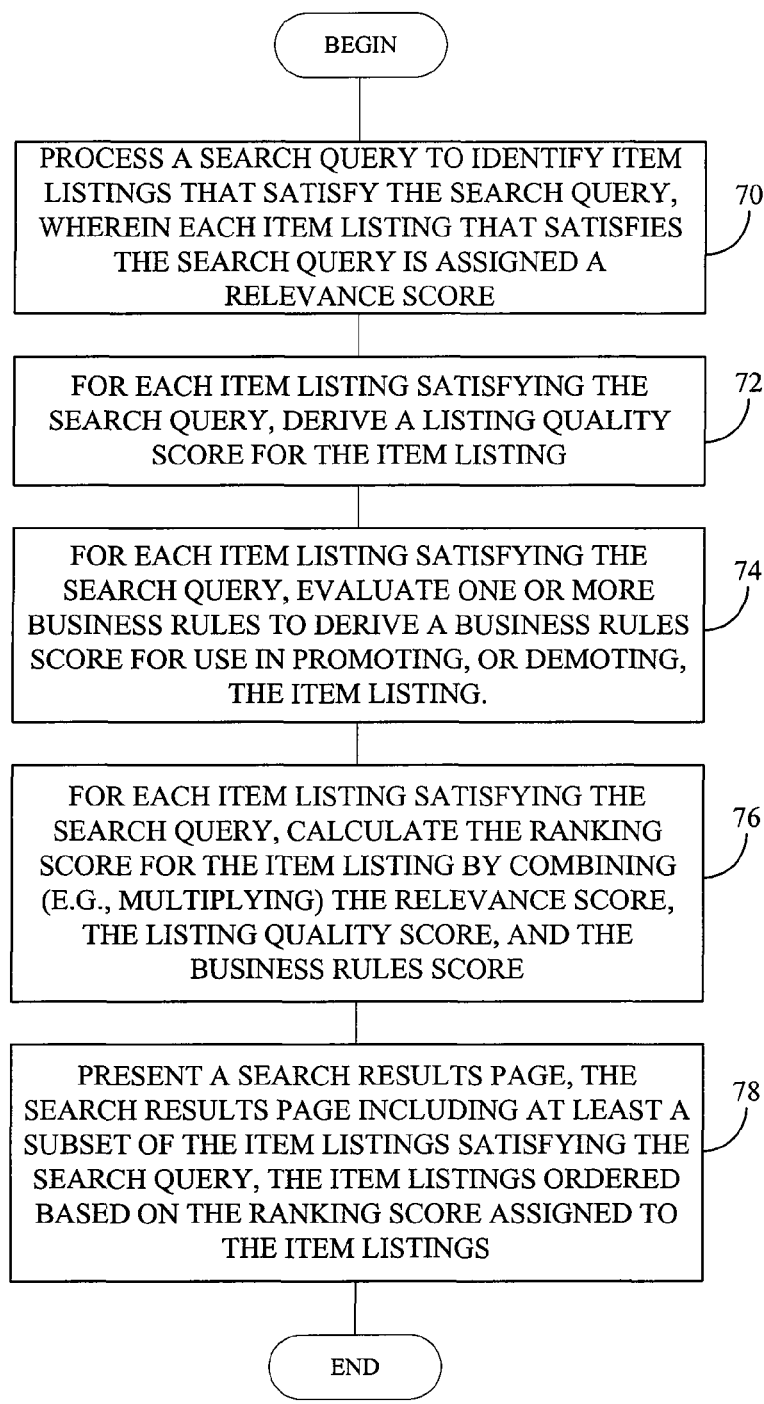
FIG. 4 illustrates an example of a method, according to an embodiment of the invention, for processing a search query and presenting item listings in a search results page.

FIG. 4 illustrates an example of a method, according to an embodiment of the invention, for processing a search query and presenting item listings in a search results page. The method begins at operation 70, when a search query is received and processed to identify item listings that satisfy the search query. As part of processing the search query, a relevance score is assigned to each item listing satisfying the search query. Accordingly, in some embodiments, the set of item listings satisfying the search query may be received, ordered based on their corresponding relevance scores.

At method operation 72, for each item listing satisfying the search query, a listing quality score is determined. Because the listing quality is not dependent upon the search terms used in the search query, in some embodiments, the listing quality score for each item listing may be pre-calculated—that is, calculated prior to the search request being processed. Accordingly, in some embodiments, the listing quality score can simply be retrieved, for example, by looking up the listing quality score in a database. Alternatively, in some embodiments, only a portion of the underlying data used for deriving the listing quality score may be pre-calculated. Therefore, in some embodiments, the listing quality score for each item may be calculated in response to the execution of the search query and the identification of the item listings satisfying the query.

In any case, at method operation 74, one or more business rules are evaluated for the item listings satisfying the search query. The evaluation of a business rule will, for some item listings, result in a business rules score that has the effect of promoting or demoting an item listing, for instance, by increasing or decreasing the overall ranking score of the item listing. For instance, when the business rules are evaluated, if the ranking score is equivalent to the relevance score multiplied by the listing quality score, upon evaluating the business rules, the ranking score will be multiplied by a business rules score. In some embodiments, a business rules score of one hundred percent (100%) is equivalent to no change—that is, no demotion, and no promotion. Likewise, a business rules score less than one hundred percent will result in a demotion, while a business rules score greater than one hundred percent will result in a promotion.

At method operation 76, the relevance score, listing quality score, and business rules score are multiplied together to derive a ranking score for each item listing. Finally, at method operation 78, the item listings are sorted in accordance with their corresponding ranking score, and presented in a search results page.

Although not shown in FIG. 4, in some embodiments, an intermingler module 44 may operate to reorder the item listings to ensure that the item listings presented on a single search results page include a number of item listings from two or more categories that is consistent with a predefined ratio. For instance, in some embodiments, the item listings may be categorized as being in one of two formats—auction format, or fixed price format. In such a scenario, it may be desirable to have a certain ratio (e.g., one-to-one) of auction format item listings to fixed price format item listings. To ensure that this ratio is met, the intermingler module may reorder the item listings, for example, by adjusting the ranking score of the item listings. In various embodiments, this may occur at different steps in the processing. For instance, in some embodiments, the intermingling may occur after the ranking score has been derived by multiplying the relevance score, and the listing quality score, and the business rules score. In other embodiments, the intermingling may occur after the product of the relevance score and listing quality score is calculated, but before adjusting for promotions or demotions based on evaluating business rules.

Listing Quality Score

As briefly noted above, in some embodiments, the ranking score (e.g., the Best Match Score) assigned to an individual item listing is based in part on a listing quality score representing a measure of the overall quality of an item listing. For instance, the quality of an item listing may be viewed as the probability that an item being offered for sale via the item listing will be purchased if the item listing is presented in a search results page. In general, with all else equal, those item listings that satisfy the user's search query and have the highest listing quality scores are presented in the most prominent positions of the search results page. As described in detail below, many factors or sub-components may go into determining the listing quality score for an item listing. Additionally, item listings may be assigned to different groups or "buckets" based on certain characteristics of the item listings, such that a different algorithm is used to determine the listing quality score used in deriving an item listing's ranking score, based on the assigned group or bucket. Similarly, item listings assigned to certain groups may be intermingled (e.g., rearranged or re-ranked) to ensure that a certain ratio or mix of item listings, based on their assigned category, are presented in a search results page.

Figure 5:
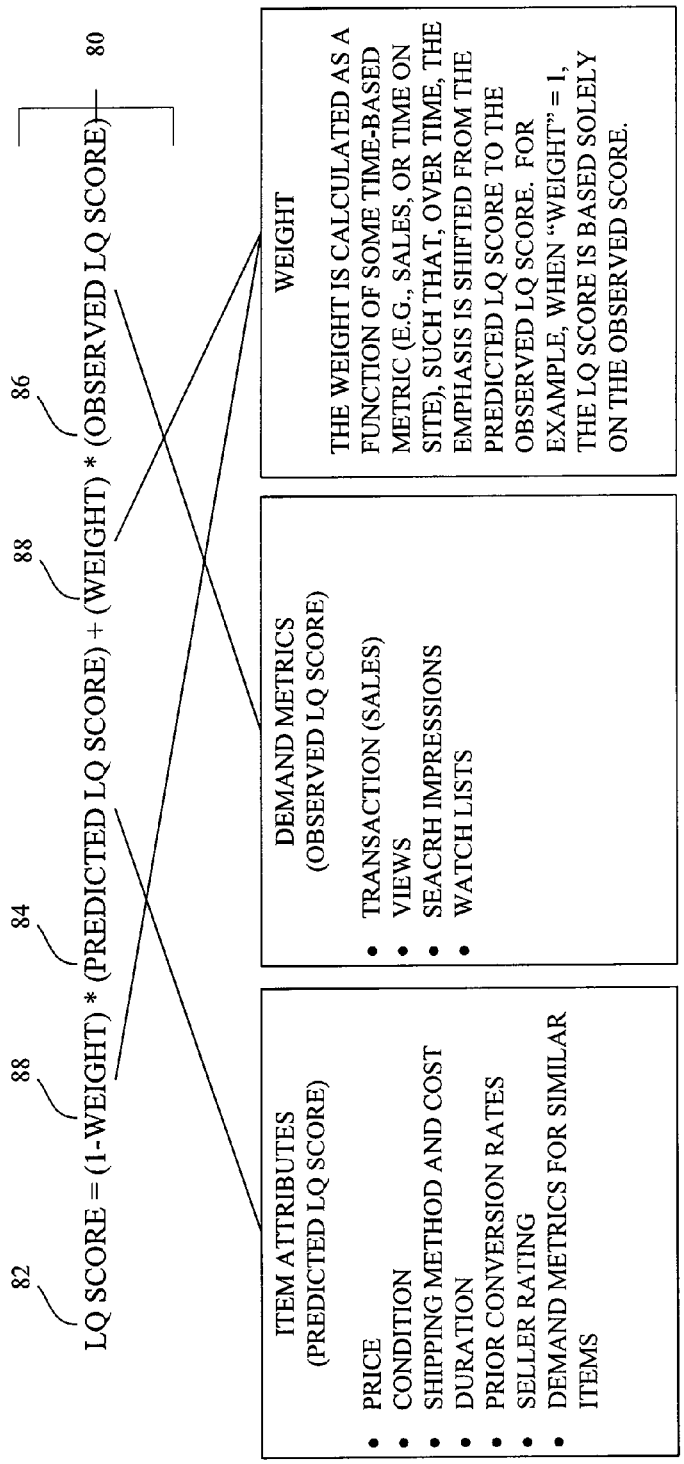
FIG. 5 illustrates an example of a formula or equation, which is used to derive a listing quality score, in some embodiments of the invention.

As illustrated in FIG. 5, the listing quality score 82 may be calculated with a formula taking the general form of the equation with reference number 80. In this equation 80, "LQ" stands for Listing Quality, and the symbol "*" represents a multiplication operation. As shown in the equation 80 presented in FIG. 5, the score 82 in some embodiments is calculated as a weighted sum of two parts—a predicted listing quality score 84, based in part on an analysis of item attributes and seller attributes known at listing time—and, an observed listing quality score 86, based on an analysis of an item listing's actual performance over time. The item attributes and seller attributes used for deriving the predicted listing quality score 84 are generally static in nature and, with a few exceptions, are not expected to change from the time the item listing is first generated. The observed listing quality score 86 is generally based on historical data obtained over the life of the item listing, and as such, is considered to be based on dynamic data.

Because a new item listing will not yet have been presented in a search results page, a new item listing will not have any associated historical data by which its performance can be measured. Accordingly, for new item listings, the listing quality score 82 is based primarily upon the predicted listing quality score 84, and is essentially a prediction of how the item listing will perform, based on an analysis of the item attributes, and in some cases seller attributes, of the item listing. In particular, the analysis used in determining the predicted listing quality score 84 involves comparing the item attributes of the item listing with item attributes of other similar item listings for which historical performance data is available. For example, if the price of an item is higher or lower than some measure of central tendency (e.g., median, mean or mode) for the prices of similar items, then this information can be used to predict how the new item listing will perform.

In addition to the price of an item, a variety of other item attributes may be considered in deriving the predicted listing quality score 84 for the overall listing quality score 82, including: the condition of the item, the shipping method and cost, the duration or length of time the item listing has been active, a seller's prior conversion rate for all items or items in a particular category, as well as a seller's rating (e.g., based on feedback provided by buyers). In general, a high price will result in a lower listing quality score 82—particularly a high price relative to the mean, median or mode price of similar item listings. Similarly, the higher the cost of shipping relative to the cost of shipping for similar item listings, the lower the listing quality score will be. With respect to the condition of the item, the better the condition stated by the seller, typically the better the listing quality score will be. Of course, a great number of other item or seller attributes might be considered when deriving the predicted listing quality score 84.

Various methods may be used to identify those item listings deemed similar to the item listing to which the listing quality score is being assigned. For instance, a comparison of the titles may be made, such that item listings using one or more of the same key words in their titles may be deemed similar. Additionally, two item listings may be deemed similar only when the item listings have similar titles and they are assigned to the same category, or are listed on the same website. Additional constraints may also be used. For instance, an item listing may be deemed similar to the item listing to which the listing quality score is being assigned if the prices of the item listings are within a certain percentage of one another. For example, this prevents an unreasonable comparison of a Mercedes Benz toy car priced at $3.00, with a Mercedes Benz classic car priced at $300,000. In some embodiments, only a certain percentage of the most similar items are used when determining the predicted listing quality score. For instance, when determining the median price of similar item listings, the median price of the top 10% of most similar item listings may be determined for comparison purposes.

In addition, when deriving the predicted listing quality score 84 for an item listing, the actual performance of item listings determined to be similar may be considered. Accordingly, the similar item listings that are of interest are the item listings that have resulted in transactions, or have some historical data available to assess their performance. For instance, if an analysis of historical data indicates that the conversion rate for a certain product is 90% when the product is priced at or below a particular price, then a prediction can be made that the likelihood that an item listing for that product with a price at or below the particular price is 90%. This may result in a high listing quality score. The number of search impressions, number of views, number of watch lists, and/or number of transactions concluded for item listings determined to be similar may provide an indication of how a new item listing will perform. In this case, a search impression is defined as the presentation of an item listing in a search results page. Accordingly, every time an item listing appears in a search results page, a search impression counter for the item listing is increased. A view occurs when an item listing presented in a search results page is selected by, and presented to, a user. A watch list is a mechanism for monitoring an item listing. For example, a potential buyer may add an item listing to a watch list so that the potential buyer receives notifications about certain events, such as, the conclusion of a transaction via an auction, and so forth. The number of unique users who add an item listing to a watch list can be used as a measure of the interest (demand) in an item listing. A transaction is the sale of an item. In some embodiments, when a user purchases an item in quantity, a single transaction will be counted. For instance, if a user buys five items via a single multi-quantity item listing, the sale of the five items is viewed as a single transaction for the purpose of determining a demand metric used in calculating the predicted score component of a listing quality score.

In some embodiments, a measure of central tendency (e.g., a median, mean or mode) is calculated for a particular item attribute, or demand metric, for a certain sized subset of similar item listings. For instance, for a certain sized subset of the most similar item listings, the median selling price, median shipping cost, median number of search impressions, and so forth, are calculated. Then, the item attributes of the item listing being assigned the predicted listing quality score are compared to these median values. If, for example, the median price at which transactions were concluded for a set of similar item listings is greater than the price of an item listing being assigned a listing quality score, then the lower price of the item listing, compared to the median price of similar item listings, should be reflected in the listing quality score as a positive (e.g., a higher score). Similarly, if the item listing being assigned a predicted listing quality score has a shipping cost that is higher than the median shipping cost for the set of similar item listings under consideration, this high shipping cost—relative to the median shipping cost of similar items— is reflected in the predicted listing quality score as a negative (e.g., lower score).

In some embodiments, the predicted listing quality score 84 may be used as the overall listing quality score 82. However, as shown in the equation 80 of FIG. 5, some embodiments utilize a weighted sum of the predicted listing quality score 84, and the observed listing quality score 86. The demand metrics that may be used to derive the observed listing quality score 86 are transactions (sales), views, search impressions, and watch lists. In some embodiments, one of these demand metrics may be used, while in other embodiments, some combination of the metrics may be used to form the overall observed listing quality score 82. In some embodiments, the exact combination or formula used to derive the observed listing quality score 86 may differ by category. For instance, the observed listing quality score 86 for item listings in the "Automobiles" category may be based on some combination of search impressions and watch lists, while the observed listing quality score 82 for item listings in the "Jewelry" category may be based on some combination of watch lists and views.

One of the issues that exists with conventional methods for assessing the quality of an item listing is that exposure (e.g., search impressions) leads to transactions (sales), which leads to more exposure. Consequently, when a listing quality score depends in part on a demand metric, such as transactions (sales), those item listings that have performed well in the past tend to be deemed as high quality, and are therefore positioned in the search results page in the most prominent positions (e.g., at the top of the first page). Of course, being placed in a prominent position on the search results page will naturally result in additional transactions (sales), leading one to believe the item listing is high in quality. This of course makes it difficult for new item listings, with no historical data available for assessing quality, to break-in to the high quality tier of item listings and receive placement in the most prominent positions in the search results page.

Some embodiments of the invention address this issue in at least two ways. First, as illustrated in FIG. 5, the listing quality score 82 in some embodiments is calculated as a weighted sum of two parts—a predicted listing quality score 84, based on an analysis of item attributes known at listing time—and, an observed listing quality score 86, based on an analysis of an item listing's actual performance over time. The weighting factor 88 is applied to the two components such that the listing quality score 82 for new item listings, which have no attainable performance history, is based primarily on the predicted score 84. For instance, in some embodiments, when an item listing is first listed, the value of the weighting factor, "WEIGHT", is set to zero. Accordingly, with "WEIGHT" equal to zero, the listing quality score 82 is equivalent to the predicted listing quality score 84. However, over time, as actual data are obtained and the performance of the item listing can be assessed, the weighting factor is changed, shifting the emphasis to the observed listing quality score 86. For instance, with a value for "WEIGHT" of one half (0.5), the weighting factor for the predicted listing quality score and observed listing quality score is equal—and equivalent to one half.

Figure 6:
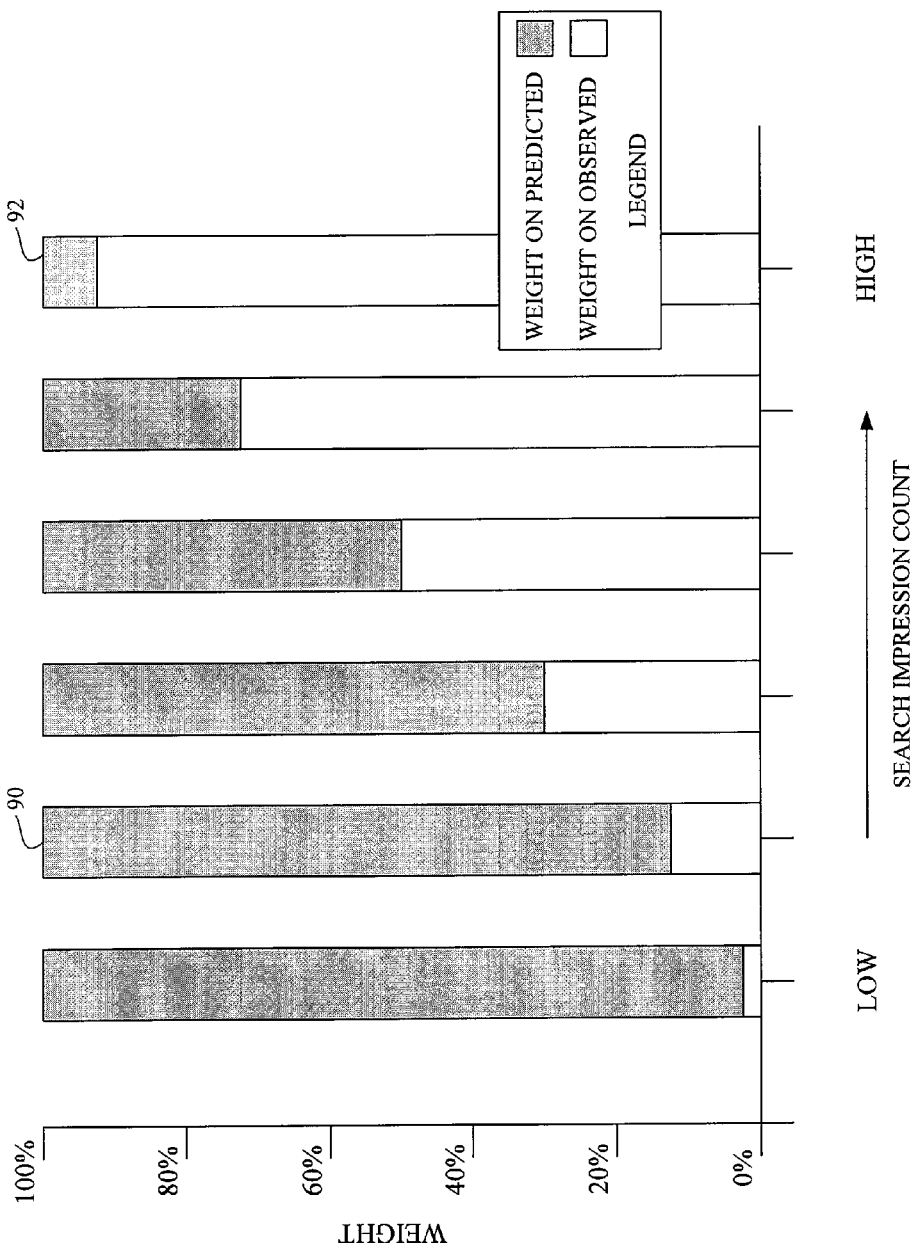
FIG. 6 illustrates a table showing how the weighting factor used in the listing quality formula changes the emphasis from a predicted score, to an observed score, as the number of search impressions increases, according to one embodiment of the invention.

Referring now to FIG. 6, in some embodiments, the weighting factor—in particular, the value of the variable expressed in the equation of FIG. 5 as "WEIGHT" 84—is derived as a function of a time-based metric. For example, the weighting factor may be a function of the length of time an item listing has been active. Alternatively, the weighting factor may be a function of the search impression count for the item listing. For instance, as illustrated in the table of FIG. 6, as indicated by the X axis, the weighting factor is a function of the search impression count. When the search impression count for the item listing is relatively low, the amount of historical data available for accurately and confidently measuring the actual performance of the item listing based on observed demand metrics is still quite low. Consequently, as indicated by the bar with reference number 90, the portion of the listing quality score attributable to the observed listing quality score is low—approximately 10%. Similarly, the portion of the listing quality score attributable to the predicted listing quality score is approximately 90%. As the search impression count increases, so too does the weighting factor, and thus, the percentage of the overall listing quality score attributable to the observed demand metric or metrics for the item listing. For example, as illustrated by the bar in FIG. 6 with reference number 92, when the search impression count is high, approximately 90% of the listing quality score is attributable to the observed listing quality score, based on historical data indicating the actual performance of the item listing.

Figure 7:
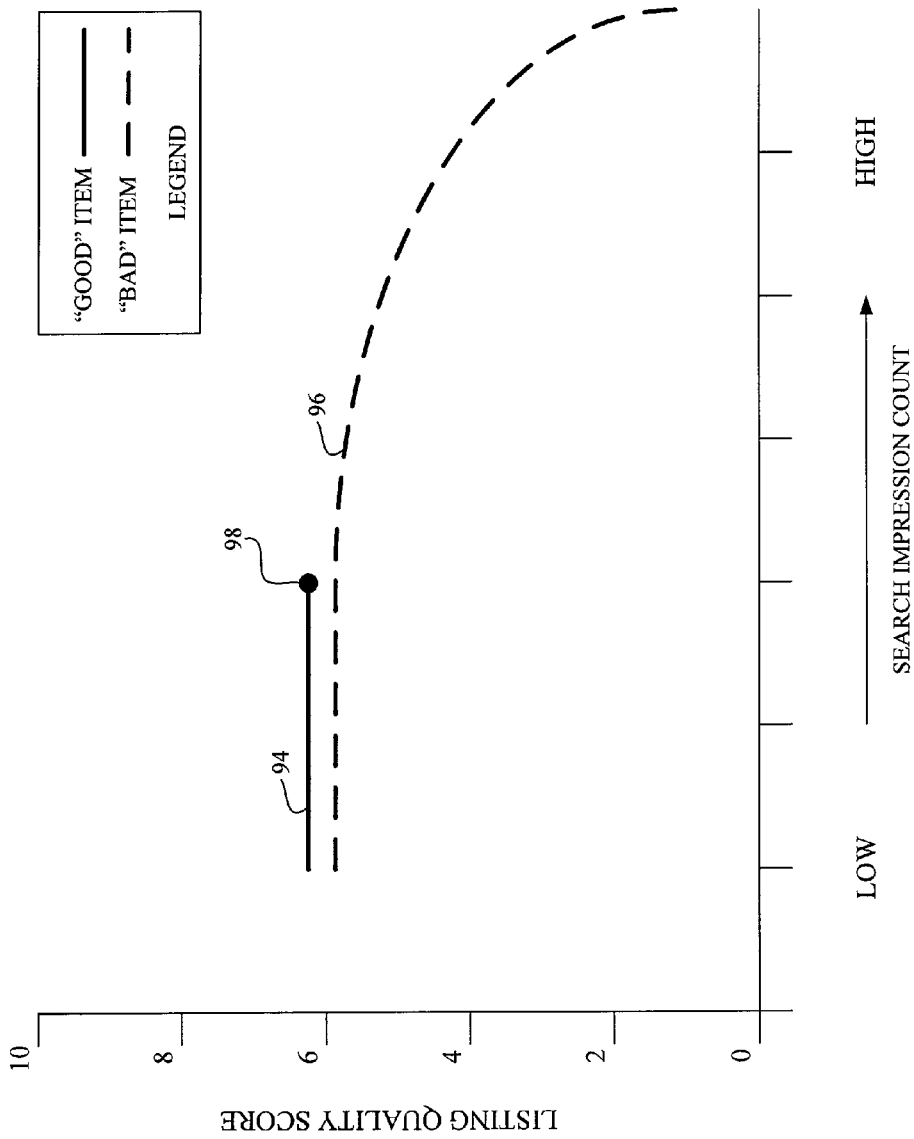
FIG. 7 illustrates a graph showing an example of the behavior of a listing quality score for a "good" (i.e., intrinsically high quality) item listing and a "bad" (i.e., intrinsically low quality) item listing over a period of time, as the search impression count for each item listings increase, according to an embodiment of the invention.

Referring now to FIG. 7, an example is provided to show the behavior of a listing quality score for a "good" (i.e., intrinsically high quality) item listing and a "bad" (i.e., intrinsically low quality) item listing over a period of time, as the search impression count for each item listing increases. As illustrated in FIG. 7, when the search impression count is low, the good item listing represented by the solid line 94 has a listing quality score that is just above six, while the bad item listing represented by the dashed line 96 has a listing quality score just below six. As described in connection with the table in FIG. 6, when the search impression count is low, the listing quality score is primarily based on the predicted listing quality score for both item listings. As the search impression count increases, the weighting factor shifts the emphasis from the predicted listing quality score to the observed listing quality score. As indicated by the terminal point 98 of the solid line 94 representing the listing quality score for the good item listing, when the search impression count increases, the high visibility (e.g., increased number of search impressions) of the good item listing results in the conclusion of a transaction. However, because the bad item listing does not result in the conclusion of a transaction with the additional search impressions, the listing quality score for the bad item listing begins to decrease as the search impression count increases. This is in part because the weighting factor for the listing quality score shifts to emphasize the observed demand metric (e.g., transactions per search impressions) for the bad item listing. Ultimately, as the search impression count becomes high, the listing quality score tends toward zero.

By basing the listing quality score of an item listing on a weighted combination of a predicted score and observed demand metrics, new item listings are not unduly penalized for their lack of performance data. Moreover, by shifting the emphasis over time from the predicted listing quality score to the observed listing quality score, those item listings that perform well are still rewarded over time by achieving higher listing quality scores, and thus being positioned prominently in the search results page.

Figure 8:
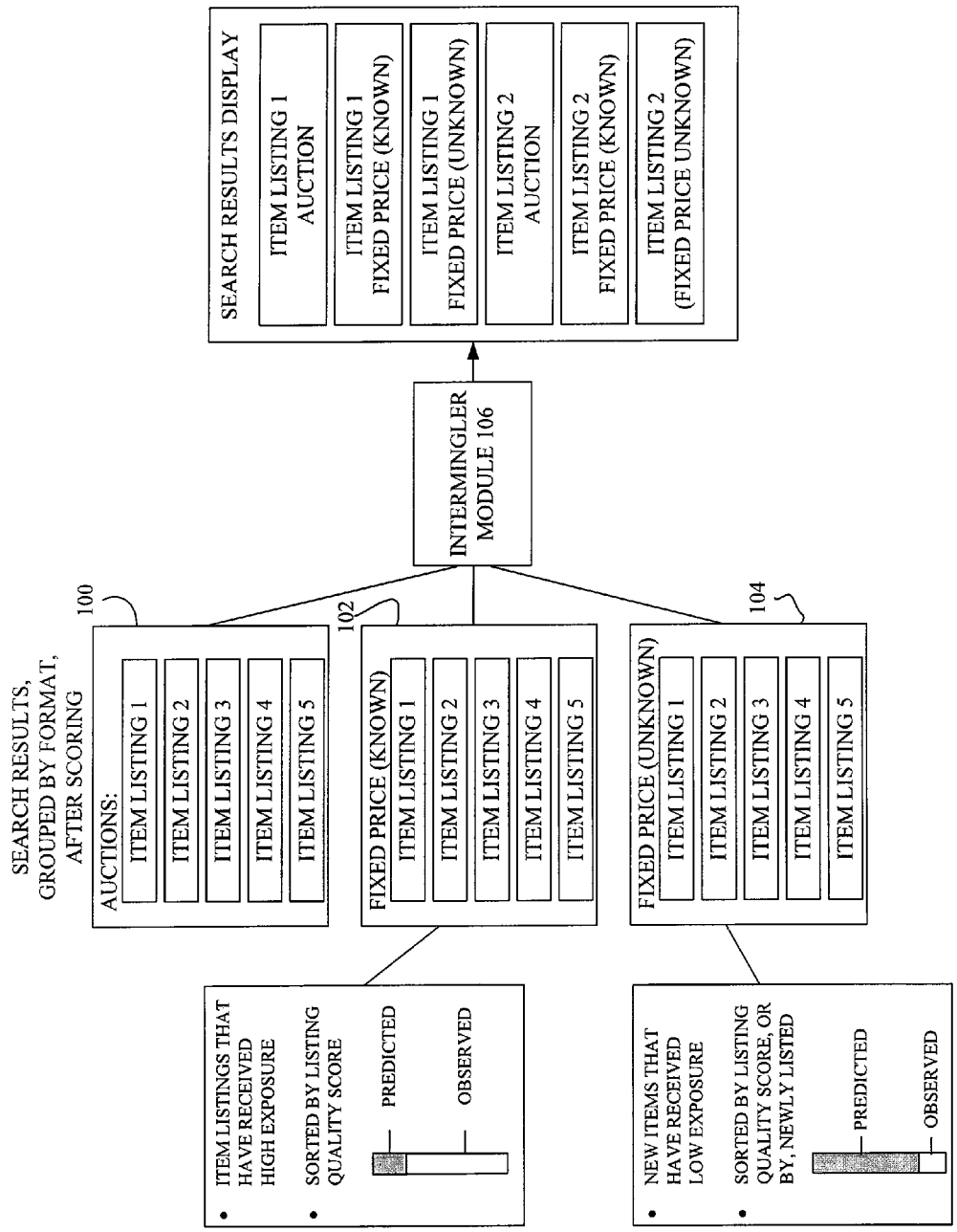
FIG. 8 illustrates a block diagram showing how, in some embodiments, item listings may be grouped to ensure new listings are displayed in the search results page.

Another mechanism used to ensure that new item listings are not unduly penalized for their lack of historical data by which their performance can be measured is the concept intermingling item listings that have been assigned to different "buckets" or groups. For example, as illustrated in FIG. 8, the search results satisfying the query are first assigned a ranking score, and then divided into buckets or groups. In this example, the item listings have been divided into three groups: item listings using an auction format 100, fixed price item listings determined to be known 102, and fixed price item listings determined to be unknown 104. In this case, an unknown item listing is in essence a new, or newer, item listing. In particular, an item listing is determined to be unknown when there is not sufficient historical data available on which to confidently derive a meaningful demand metric for the item listing. For example, an item listing may be categorized in the unknown group until the item listing has been presented in a search results page a predetermined number of times, and its search impression count reaches some threshold. When the threshold for the search impression count for a particular item listing is reached, the item listing is re-categorized into the known group. By grouping the item listings into known and unknown categories, the intermingler module 106 and format enforcement module (not shown) can be used to ensure that new or newer item listings, which do not yet have sufficient data to reach the top tier of ranking scores, will be presented in the search results page. For instance, a ratio may be established for the target number of known-to-unknown category item listings that are to appear in each search results page. The intermingle module 106, in conjunction with the format enforcement module, may rearrange the item listings to ensure the defined ratio is met. Over time, as the search impression count for these unknown item listing increases, the item listings will "graduate" into the known category.

Figure 9:
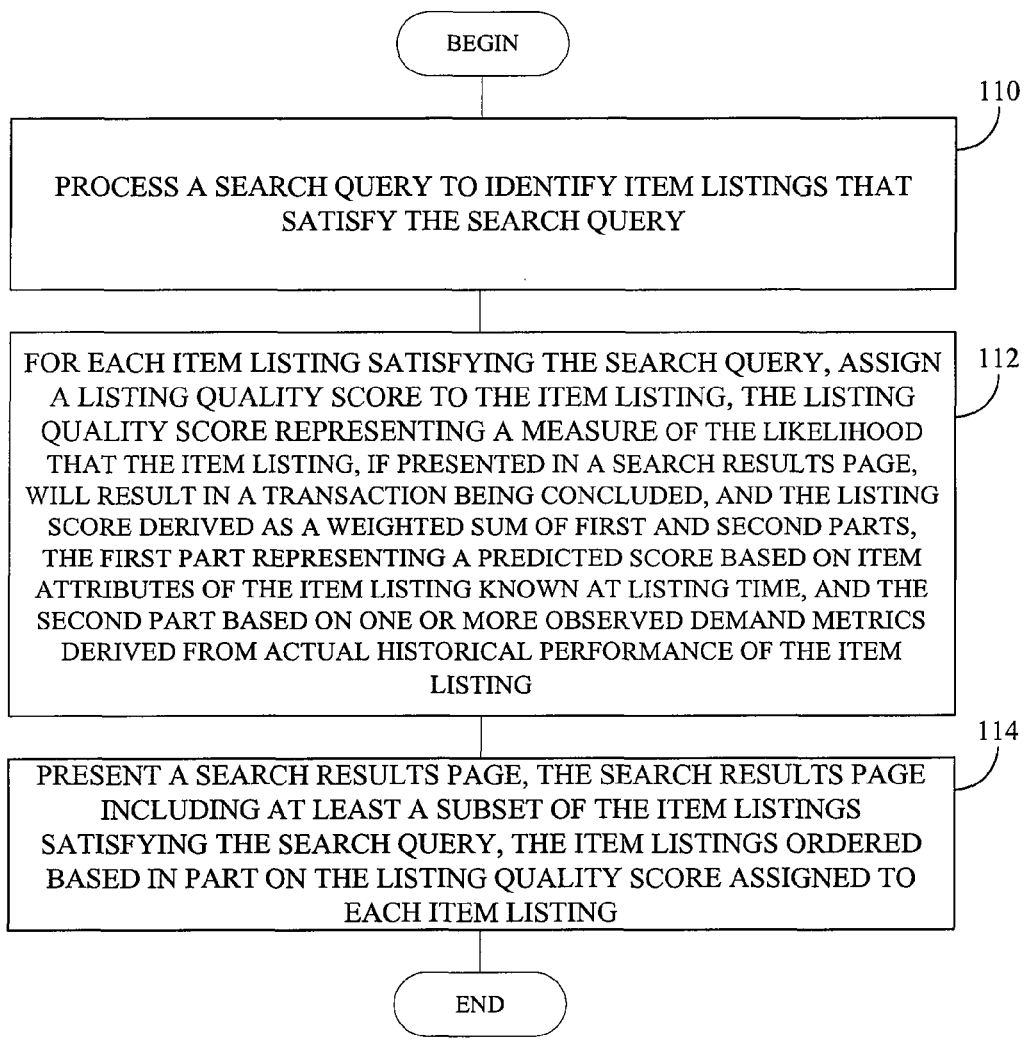
FIG. 9 illustrates a method, according to an embodiment of the invention, for presenting search results based on a listing quality score

FIG. 9 illustrates a method, according to an embodiment of the invention, for presenting search results based on a listing quality score. The method begins at method operation 110 when a search query is processed to identify item listings that satisfy the search query. At method operation 112, for each item listing that satisfies the search query, a listing quality score is assigned to the item listings. The listing quality score for each item listing is derived as a weighted sum of two parts—a first part representing a predicted listing quality score, based on analysis of item attributes that are known at listing time—and, a second part representing an observed score based on one or more demand metrics derived from historical data observed over time. The weighting factor applied to the two parts is a function of a time-based metric, such as the search impression count for the item listings. Accordingly, over time, as the item listing receives search impressions, the emphasis on the overall listing quality score for item listing will shift from the predicted listing quality score to the observed listing quality score. Finally, at method operation 114, the item listings are presented in a search results page, ordered based at least in part on the listing quality score assigned to the item listings.

Business Rules

As briefly noted above, in some embodiments, the ranking score (e.g., the Best Match Score) assigned to each item listing that satisfies a user's search query may be adjusted (up or down) to reflect a promotion or demotion, based on the evaluation of one or more business rules. For example, it may be desirable to promote or demote item listings that have certain item attributes or seller attributes. If, for example, an item listing has free shipping, the listing may be promoted. Similarly, if a seller has a low seller quality score (based in part on feedback from buyers), an item listing of the seller may be demoted to reflect the poor seller quality score. In some cases, when the business rules are transparent and therefore known to both the sellers and buyers, promotions and demotions might be used to encourage certain behavior.

Figure 10:
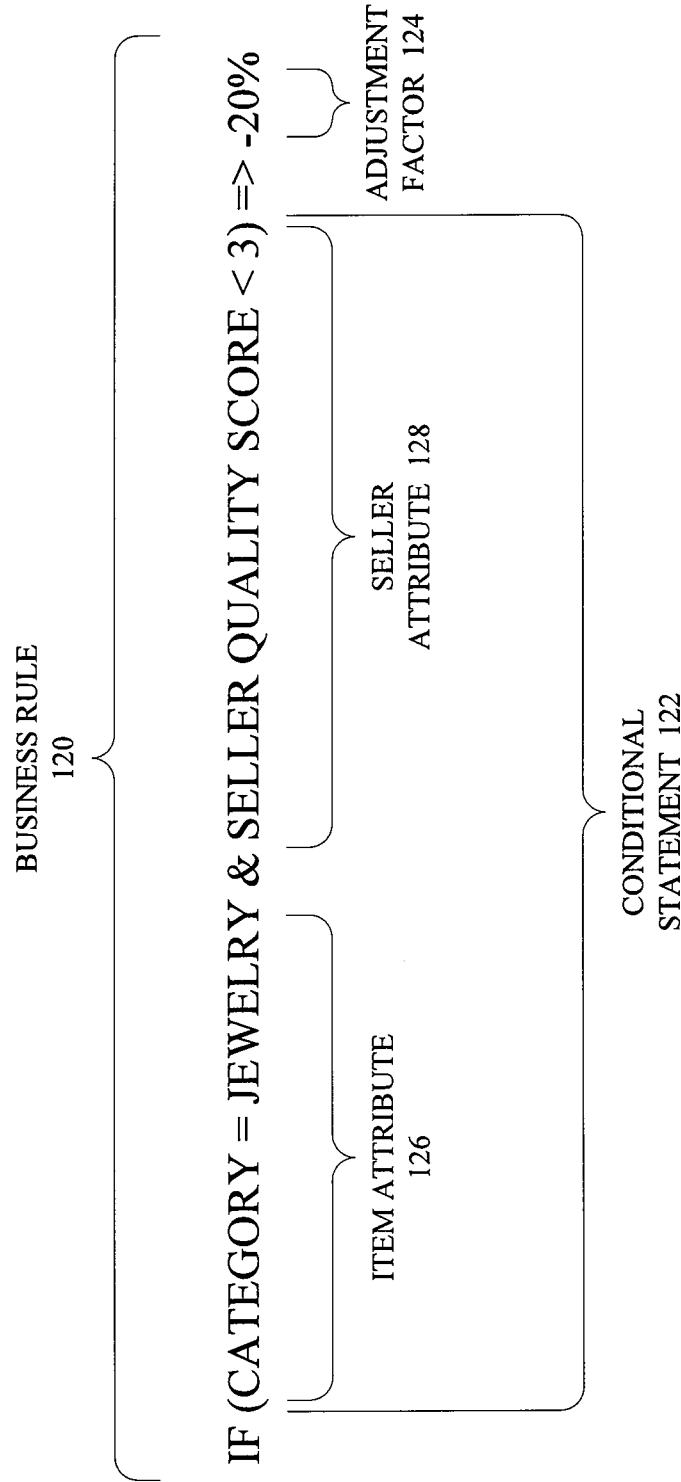
FIG. 10 illustrates an example of a business rule, which might be used to demote an item listing, according to an embodiment of the invention.

FIG. 10 illustrates an example of a business rule 120, which might be used to demote an item listing, according to an embodiment of the invention. As illustrated in FIG. 10, the business rule 120 is comprised of two parts—a conditional statement 122 and an adjustment factor 124. In this example, the conditional statement sets forth two expressions joined by an "&" symbol, wherein one expression 126 involves an item attribute, and the other expression 128 involves a seller attribute. Accordingly, the conditional statement evaluates to true only when both expressions are true. In this example, the conditional statement will be true (and thus satisfied) if the item listing being considered is in the category, "JEWELRY", and the seller quality score for the seller associated with the item listing is less than three. If both expressions are true, the rule is satisfied and the ranking score for the item listing is adjusted by the amount specified by the adjustment factor—in this case, decreased by twenty percent.

In some embodiments, rules can be expressed using Boolean logic, with "AND" and "OR" expressions, and using any number and combination of item and seller attributes. The business rule 120 expressed in FIG. 10 is based on the evaluation of both an item attribute (e.g., Category) and a seller attribute (e.g., seller quality score). Although business rules may be used to reflect a wide variety of business policies two particular examples are worth describing here. First, in some embodiments, business rules may be used to promote item listings that have free shipping. For instance, when a seller creates an item listing and designates the listing as having free shipping, the item listing may receive a promotion, and therefore be displayed in more prominent position in the search results page. This policy reflects a desire to prevent sellers from generating listings with artificially low prices with corresponding artificially inflated shipping charges. Similarly, in some embodiments, business rules might be used to demote item listings that have a shipping cost that exceeds the median (or, mean or mode) shipping cost for similar items. In a second example, a business rule may promote or demote an item listing based on the seller's trust score or seller quality score. In some embodiments, different business rules might be assigned to different categories, different web sites, or based on different item attributes, such as the listing format (e.g., auction, fixed-price, classified ad, and so on). For instance, with some types of items, such as antiques and/or jewelry, the seller trust factor may be more important, as there may be more fraud prevalent in the trade of such items.

Figure 11:
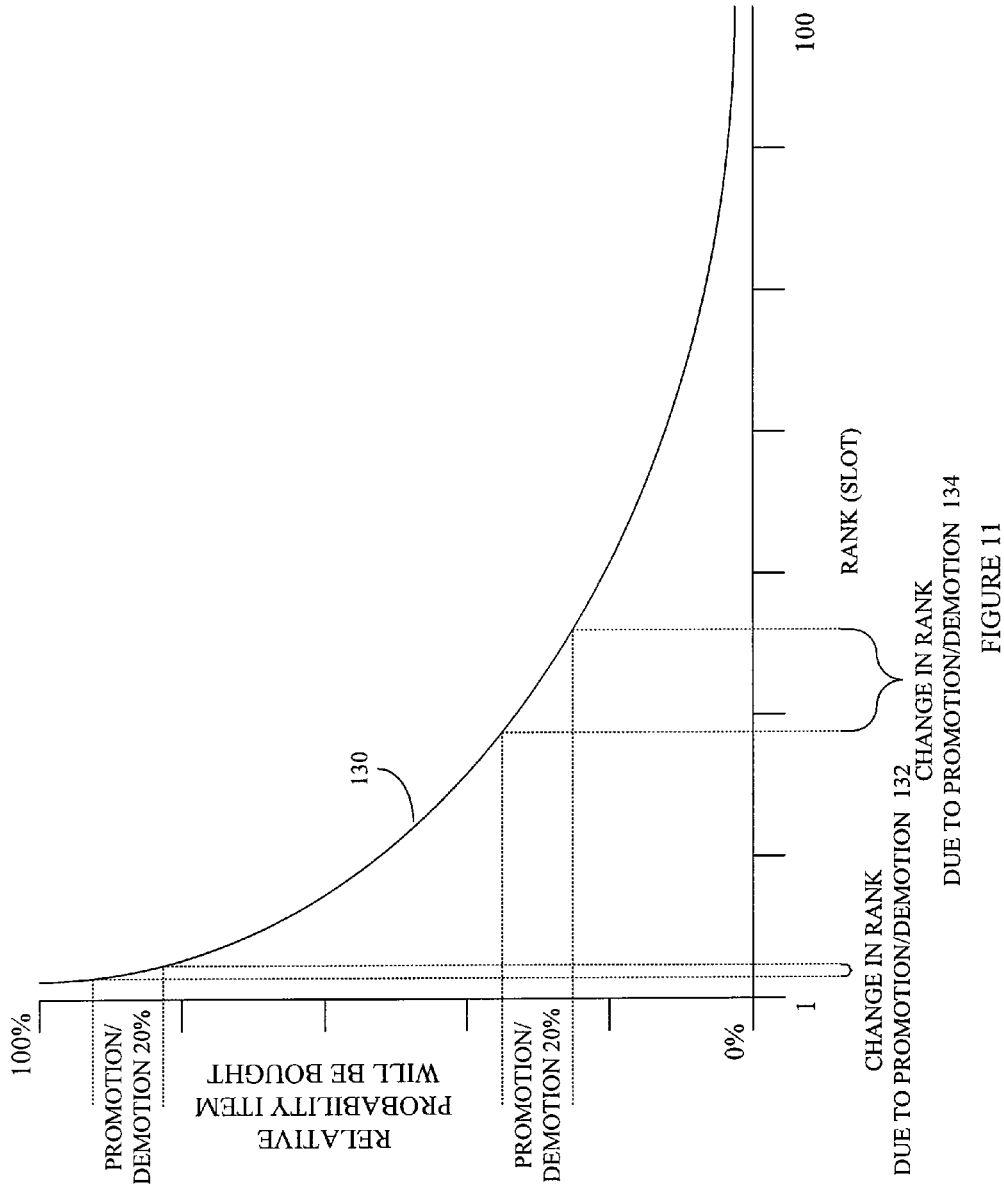
FIG. 11 illustrates a chart showing the relationship between an item listing's rank and the probability that the item will be purchased, as well as the effect of a promotion or demotion, according to an embodiment of the invention.

FIG. 11 illustrates a chart showing the relationship between an item listing's rank and the probability that the item will be purchased, as well as the effect of a promotion or demotion, according to an embodiment of the invention. In FIG. 11, the X-axis represents the rank or slot in which an item listing is to be presented. The Y-axis represents the relative probability that the item listing will be purchased. Accordingly, the curved line with reference number 130 represents the relative probability that an item will be purchased, given its rank or slot in the search results page. From the chart, it can be seen that when an item listing is presented in the lowest ranking slot (e.g., slot number one, representing in some embodiments, the top of the list), it has the greatest probability of resulting in a transaction (e.g., a sale). As the slot or rank decreases, so too does the probability that the item listing will result in a transaction (e.g., a sale).

Referring again to FIG. 11, it can be seen that the effect of a twenty percent change, resulting from a promotion or demotion, is different, depending on the item listing's current slot position or rank. For example, when the item listing's current rank (or, slot position) is near the top of the search results page, a twenty percent promotion/demotion has a less significant impact 132 than when the item listing's current rank is lower, for example, on the second or third page of the search results page. For instance, the change in rank indicated by the lines with reference number 132 is less significant than the change in rank indicated by the lines with reference number 134.

Figure 12:
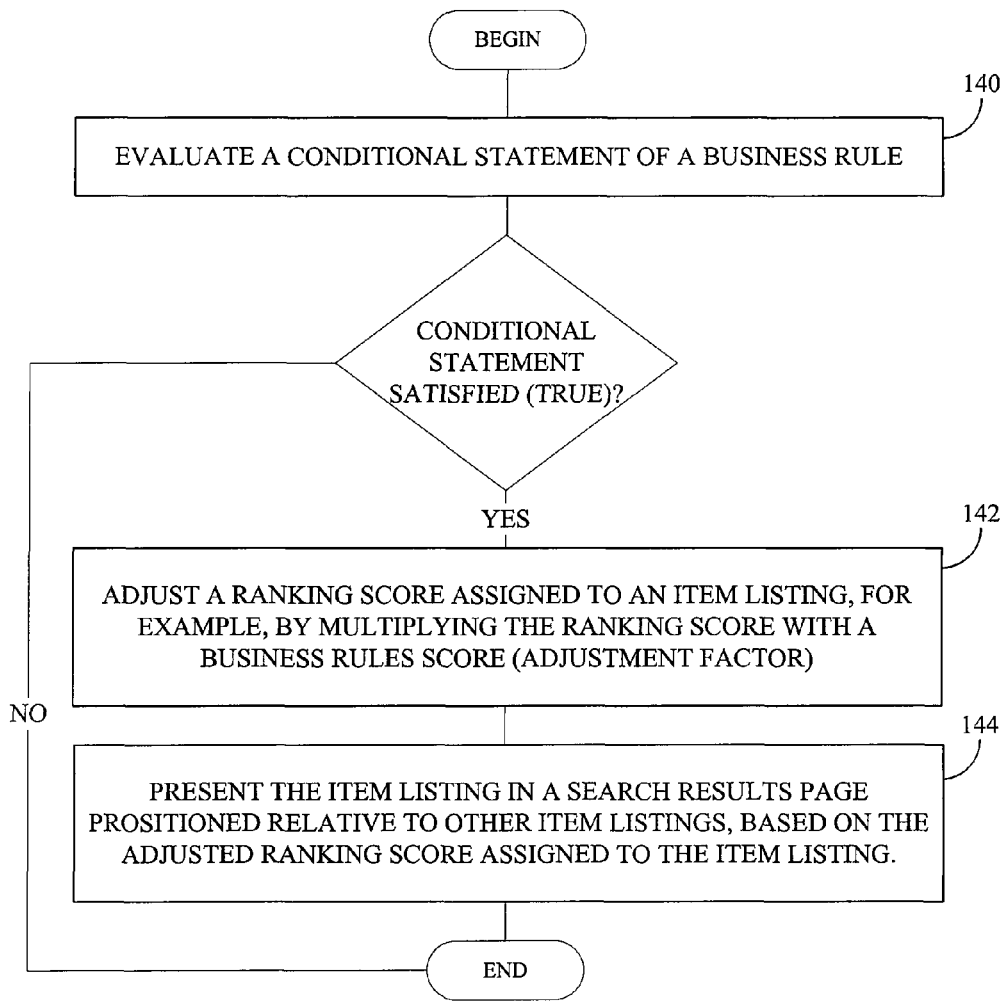
FIG. 12 illustrates a method, according to an embodiment of the invention, for utilizing a business rule to adjust the ranking score assigned to an item listing.

FIG. 12 illustrates a method, according to an embodiment of the invention, for utilizing a business rule to adjust the ranking score assigned to an item listing. At method operation 140, a conditional statement of a business rule is evaluated. The conditional statement may be in one or several parts, combined by Boolean expressions, and may call for the evaluation of an expression including an item attribute or a seller attribute. At method operation 142, if the conditional statement evaluated in operation 140 is true, then an adjustment factor is applied to a ranking score assigned to the item listing under consideration. The adjustment factor may be expressed as a percentage by which the ranking score is to be increased (for a promotion) or decreased (for a demotion). Finally, at method operation 144, the item listing is presented in a search results page, positioned with the page relative to other item listings, based on the adjusted ranking score associated with and assigned to the item listing.

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., Application Program Interfaces (APIs).)

Example Computer System

Figure 13:
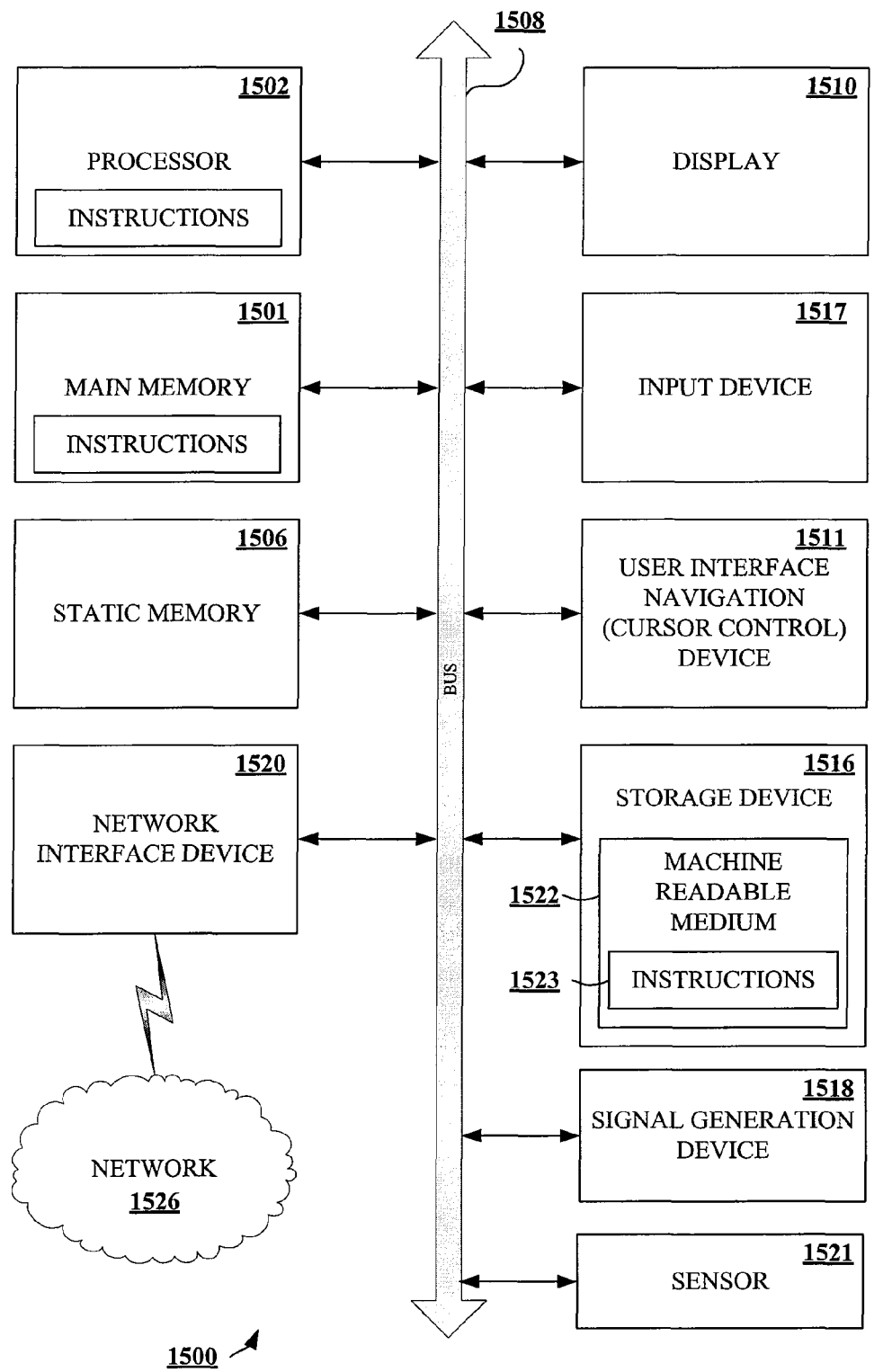
FIG. 13 is a block diagram of a machine in the form of a mobile device within which a set of instructions, for causing the machine to perform any one or more of the methodologies discussed herein, may be executed.

FIG. 13 is a block diagram of a machine in the form of a mobile device within which a set of instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in server-client network environments, or as a peer machine in peer-to-peer (or distributed) network environments. The machine may be a personal computer (PC), a tablet PC, a set-top box (STB), a Personal Digital Assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1500 includes a processor 1502 (e.g., a central processing unit (CPU), a graphics processing unit (GPU) or both), a main memory 1501 and a static memory 1506, which communicate with each other via a bus 1508. The computer system 1500 may further include a display unit 1510, an alphanumeric input device 1517 (e.g., a keyboard), and a user interface (UI) navigation device 1511 (e.g., a mouse). In one embodiment, the display, input device and cursor control device are a touch screen display. The computer system 1500 may additionally include a storage device (e.g., drive unit 1516), a signal generation device 1518 (e.g., a speaker), a network interface device 1520, and one or more sensors 1521, such as a global positioning system sensor, compass, accelerometer, or other sensor.

The drive unit 1516 includes a machine-readable medium 1522 on which is stored one or more sets of instructions and data structures (e.g., software 1523) embodying or utilized by any one or more of the methodologies or functions described herein. The software 1523 may also reside, completely or at least partially, within the main memory 1501 and/or within the processor 1502 during execution thereof by the computer system 1500, the main memory 1501 and the processor 1502 also constituting machine-readable media.

While the machine-readable medium 1522 is illustrated in an example embodiment to be a single medium, the term "machine-readable medium" may include a single medium or multiple media (e.g., a centralized or distributed database, and/or associated caches and servers) that store the one or more instructions. The term "machine-readable medium" shall also be taken to include any tangible medium that is capable of storing, encoding or carrying instructions for execution by the machine and that cause the machine to perform any one or more of the methodologies of the present invention, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices, e.g., EPROM, EEPROM, and flash memory devices; magnetic disks such as internal hard disks and removable disks; magneto-optical disks; and CD-ROM and DVD-ROM disks.

The software 1523 may further be transmitted or received over a communications network 1526 using a transmission medium via the network interface device 1520 utilizing any one of a number of well-known transfer protocols (e.g., HTTP). Examples of communication networks include a local area network ("LAN"), a wide area network ("WAN"), the Internet, mobile telephone networks, Plain Old Telephone (POTS) networks, and wireless data networks (e.g., Wi-Fi® and WiMax® networks). The term "transmission medium" shall be taken to include any intangible medium that is capable of storing, encoding or carrying instructions for execution by the machine, and includes digital or analog communications signals or other intangible medium to facilitate communication of such software.

Although an embodiment has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

What is claimed is:

1. A computer-implemented method comprising:
    processing a query to identify item listings that satisfy the query, each item listing associated with at least one item being offered for sale;
    assigning a score to each item listing that satisfies the query, the score i) representing a measure of the likelihood that an item listing, if presented in a search results page, will result in a transaction being concluded, and ii) derived as a weighted sum of first and second parts, the first part representing a predicted score based on item attributes of the item listing known at listing time, and the second part based on an observed demand metric derived from historical performance data of the item listing, the predicted score being derived based on an analysis of an item attribute specifying an offering price for an item offered via an item listing satisfying the query, the analysis including a comparison of the offering price for the item offered via the item listing satisfying the query with historical data indicating prices at which items determined to be similar to the item offered via the item listing satisfying the query have sold; and
    presenting the item listings that satisfy the query in the search results page displayed in a user interface of a client device, each item listing positioned in the search results page based on the score assigned to the item listing.

2. The computer-implemented method of claim 1, wherein the predicted score based on item attributes known at listing time is derived by comparing item attributes of an item listing satisfying the query with item attributes of similar item listings that have previously concluded transactions.

3. The computer-implemented method of claim 1, wherein the observed metrics representing actual historical performance of the item listing are based on data generated after the listing time of the item listing satisfying the query.

4. The computer-implemented method of claim 1, wherein one of the observed metrics representing actual historical performance of the item listing is calculated as a ratio of the number of transactions concluded per the number of search impressions for the item listing.

5. The computer-implemented method of claim 1, wherein one of the observed metrics representing actual historical performance of the item listing is calculated as a ratio of transactions concluded per duration of time since the item listing was first listed.

6. The computer-implemented method of claim 1, wherein one of the observed metrics representing actual historical performance of the item listing is calculated as a ratio of the number of times an item listing is selected for viewing per the number of search impressions for the item listing.

7. The computer-implemented method of claim 1, wherein one of the observed metrics representing actual historical performance of the item listing is calculated as a ratio of the number of times an item listing is added to a watch list per the number of search impressions for the item listing.

8. The computer-implemented method of claim 1, wherein the first part representing the predicted score is weighted with a weighting factor that is a function of the number of search impressions for the item listing such that the weighting factor for the first part decreases as the number of search impressions for the item listing increases.

9. The computer-implemented method of claim 1, wherein the second part representing observed metrics is weighted with a weighting factor that is a function of the number of search impressions for the item listing such that the weighting factor for the second part increases as the number of search impressions for the item listing increases.

10. The computer-implemented method of claim 1, wherein presenting the item listings that satisfy the query in the search results page, each item listing positioned in the search results page based on the score assigned to the item listing includes presenting the item listings as a list such that the item listing assigned the highest score is presented at the top of the list.

11. A server comprising:
    a search engine module to process a query to identify item listings that satisfy the query, each item listing associated with at least one item being offered for sale;
    a ranking score assignment module to assign a score to each item listing that satisfies the query, the score i) representing a measure of the likelihood that an item listing, if presented in a search results page, will result in a transaction being concluded, and ii) derived as a weighted sum of first and second parts, the first part representing a predicted score based on item attributes of the item listing known at listing time, and the second part based on observed metrics representing actual historical performance of the item listing, the predicted score being derived based on an analysis of an item attribute specifying an offering price for an item offered via an item listing satisfying the query, the analysis including a comparison of the offering price for the item offered via the item listing satisfying the query with historical data indicating prices at which items determined to be similar to the item offered via the item listing satisfying the query have sold; and a presentation module to present the item listings that satisfy the query in the search results page displayed in a user interface of a client device, each item listing positioned in the search results page based on the score assigned to the item listing, wherein said modules are implemented using one or more hardware-based processors.

12. The server of claim 11 wherein the predicted score based on item attributes known at listing time is derived by comparing item attributes of an item listing satisfying the query with item attributes of similar item listings that, when presented in a search results page, have resulted in transactions.

13. The server of claim 11, wherein the observed metrics representing actual historical performance of the item listing are based on data generated after the listing time of the item listing satisfying the query.

14. The server of claim 11, wherein one of the observed metrics representing actual historical performance of the item listing is calculated as a ratio of the number of transactions concluded per the number of search impressions for the item listing.

15. The server of claim 11, wherein one of the observed metrics representing actual historical performance of the item listing is calculated as a ratio of transactions concluded per duration of time since the item listing was first listed.

16. The server of claim 11, wherein one of the observed metrics representing actual historical performance of the item listing is calculated as a ratio of the number of times an item listing is selected for viewing per the number of search impressions for the item listing.

17. The server of claim 11, wherein one of the observed metrics representing actual historical performance of the item listing is calculated as a ratio of the number of times an item listing is added to a watch list per the number of search impressions for the item listing.

18. The server of claim 11, wherein the first part representing predicted score is weighted with a weighting factor that is a function of the number of search impressions for the item listing such that the weighting factor for the first part decreases as the number of search impressions for the item listing increases.

19. The server of claim 11, wherein the second part representing observed metrics is weighted with a weighting factor that is a function of the number of search impressions for the item listing such that the weighting factor for the second part increases as the number of search impressions for the item listing increases.

20. The server of claim 11, wherein presenting the item listings that satisfy the query in the search results page, each item listing positioned in the search results page based on the score assigned to the item listing includes presenting the item listings as a list such that the item listing assigned the highest score is presented at the top of the list.

21. A method comprising:
processing a query to identify item listings that satisfy the query;
assigning the item listing that satisfies the query to one of two groups based on a determination of whether an item listing has associated with it sufficient historical data to derive a measure of performance for the item listing such that a first group includes those item listings with sufficient historical data to derive a measure of performance for the item listing, and a second group includes those item listings without sufficient historical data to derive the measure of performance for the item listing, the measure of performance being determined at least in part based on a predicted score derived based on an analysis of an item attribute specifying an offering price for an item offered via an item listing satisfying the query, the analysis including a comparison of the offering price for the item offered via the item listing satisfying the query with historical data indicating prices at which items determined to be similar to the item offered via the item listing satisfying the query have sold; and
presenting item listings from the first group and the second group in a search results page displayed in a user interface of a client device.

* * * * *